United States Patent [19]

Nakayama et al.

[11] Patent Number: 5,011,272
[45] Date of Patent: Apr. 30, 1991

[54] COMPACT ZOOM LENS

[75] Inventors: Hiroki Nakayama, Kanagawa; Nozomu Kitagishi, Tokyo; Jun Hattori, Kanagawa; Shigeyuki Suda; Akihisa Horiuchi, both of Tokyo, Japan

[73] Assignee: Canon Kabushiki Kaisha, Tokyo, Japan

[21] Appl. No.: 329,588

[22] Filed: Mar. 27, 1989

Related U.S. Application Data

[63] Continuation of Ser. No. 810,670, Dec. 18, 1985, abandoned.

[30] Foreign Application Priority Data

Dec. 21, 1984 [JP] Japan ............... 59-271261
May 13, 1985 [JP] Japan ............... 60-102399
Jun. 25, 1985 [JP] Japan ............... 60-138195

[51] Int. Cl.$^5$ .......... G02B 15/00; G02B 3/00; G02B 9/00
[52] U.S. Cl. ............... 350/427; 350/413; 350/423; 350/426
[58] Field of Search ............... 350/413, 423, 426, 427, 350/481, 455

[56] References Cited

U.S. PATENT DOCUMENTS

| | | | |
|---|---|---|---|
| 3,729,253 | 4/1973 | Moore et al. | 350/413 X |
| 4,571,032 | 2/1986 | Someya et al. | 350/413 |
| 4,571,033 | 2/1986 | Kato et al. | 350/423 |
| 4,659,186 | 4/1987 | Sato et al. | 350/427 X |
| 4,726,688 | 2/1988 | Nakayama et al. | 350/427 |
| 4,730,906 | 3/1988 | Okudaira | 350/458 |

FOREIGN PATENT DOCUMENTS 124951 1/1986 Japan ............... 350/413

OTHER PUBLICATIONS

Camera International No. 4, Apr. 1965, pp. 36–37.
Introduction to Classical and Modern Optics, Second Edition, Jurgen R. Meyer—Arendt, M.D., pp. 362–365 (1984).
"Design of a Gradient-Index Photographic Objective", Applied Optics, vol. 21, No. 6, pp. 993–998 (Mar. 15, 1982).
"Gradient-Index Wide-Angle Photographic Objective Design", Applied Optics, vol. 23, No. 11, pp. 1735–1741 (Jun. 1, 1984).

Primary Examiner—Bruce Y. Arnold
Assistant Examiner—James Phan
Attorney, Agent, or Firm—Fitzpatrick, Cella, Harper & Scinto

[57] ABSTRACT

A zoom lens including at least two lens units of which the front one is of positive refractive power and the rear one is of negative refractive power, the units being axially movable to decrease their separation in zooming from the wide angle to the telephoto end. At least one of the lens units is provided with at least one refractive index distribution type lens arranged on a common optical axis of the other lenses in order to achieve a great advance in compactness.

10 Claims, 15 Drawing Sheets

COMPACT ZOOM LENS

This application is a continuation of application Ser. No. 810,670 filed Dec. 18, 1985.

BACKGROUND OF THE INVENTION

1. Field of the Invention

This invention relates to zoom lenses, and more particularly to zoom lenses having general configuration of the telephoto type.

2. Description of the Prior Art

The recent trend of reducing the size of cameras is accompanied with increasing demands for small-sized zoom lenses of short total length. Even in the field of lens shutter cameras whose lenses are not interchangeable, the desire that such lenses are also of the zoom type is becoming stronger. What is more popular with the recent public than, for example, the single lens reflex camera which, though its lens being interchangeable, is bulky and incovenient to carry about, is one whose size is compact enough to be put into a pocket of the user's clothing without hurting the user when he carries it about.

To meet such a requirement, there has been proposed a zoom lens whose every lens element is made of homogeneous material or glass, and which comprises a first lens unit by positive power followed rearwardly of a second lens unit of negative power, these two units being moved axially in differential relation to effect zooming, as, for example, disclosed in Japanese Laid-Open Patent Application No. SHO 57-201213.

However, in the case of the aforesaid configuration, in order to shorten the zoom lens in the longitudinal and lateral directions, one method is to strengthen the power of each lens unit. If so, variation of aberrations with zooming is caused to intensify. To minimize the range of variation of aberrations, the total number of lens elements may be increased to suppress the production of aberrations. But this calls for a large increase in the physical length of the zoom lens. Conversely when the power is weakened to maintain the aberrations stable throughout the zooming range, an alternative problem arises that the total zooming movement of each unit must be increased in contradistinction to the minimization of the size of the entire system.

Another problem of the 2-unit zoom lens is that, as compared with the orthodox zoom lens having four lens units or the focusing unit, variator, compensator and relay lens arranged in this order from front, the degree of convergence of light rays emerging from the positive first lens unit tends to be far higher. For this reason, the focal length of the first lens unit must be made equal to or shorter than the shortest focal length of the entire system. Or otherwise it would be very difficult to realize the desired compact zoom lens. Such increase in the refractive power of the first lens unit causes the Petzval sum to take a large positive value. For the focal lengths of the entire system to have desired values, the refractive power of the rear lens unit has to be increased in the negative sense. Therefore, it becomes more difficult to achieve good stability of aberration correction throughout the entire zooming range.

SUMMARY OF THE INVENTION

An object of the present invention is to provide a zoom lens which enables a great advance in compactness, and still further a large reduction in the total number of lens elements, to be achieved, while nevertheless permitting the image aberrations to be maintained stable at an extremely small level throughout the entire zooming range.

To achieve this, according to the invention, use is made of a refractive index distribution type lens. As has already been known in the literature, this lens is characterized in that, within the interior, there is a varying distribution of refractive indices either along the radius (hereinafter referred to as "radial" type) or along the optical axis ("axial" type).

Since light is refracted not only by the lens surfaces, but also in passing through the interior, for such a lens is given the same refractive power as that of the conventional lens made of homogeneous material or glass, its surface curvatures can be weakened with an advantage of correcting spherical aberration. Because the lens interior has the converging or diverging action, it produces a Petzval sum. But its value in terms of the focal length of the entire system normalized to unity, $P = \rho/N_0^2$, where $\rho$ is the power of the lens and $N_0$ is the value of the refractive index in the paraxial region of the lens, is smaller than that produced from the surfaces of the conventional lens, or $P = \rho/N_0$. Therefore, another advantage is that curvature of field decreases, when the lens is of the radial type. In the case of the axial type too, as the refractive index is different with different heights of incidence, spherical aberration and higher order aberrations can be advantageously corrected.

Particularly the more compact the zoom lens of the character described above, the stronger the tendency toward under-correction of the curvature of field becomes. For this reason, it is recommended that the front lens unit of positive power be provided with a radial type refractive index distributive lens, and the Petzval sum is thereby reduced with improvement of correction of the field of curvature.

Also, the rear surface of the front part of the entire system, which has a duty of contributing a positive refractive power, affects spherical aberration toward undercorrection, and further this surface often produces outward coma. So, a refractive index distribution type lens is introduced into this positive front part (at the first lens unit or the next lens unit of positive power which remains stationary during zooming, or at each of these two units), it being made possible to thereby correct residual spherical aberration and coma, and to maintain good correction of aberrations stable throughout the entire zooming range.

Thus, the use of at least one refractive index distribution type lens provides a possibility of realizing a zoom lens of greatly reduced size while maintaining good stability of aberration correction throughout the zooming range. For a concrete shape of refractive index distribution, it is desirable that as the height from the optical axis increases, the negative refractive power becomes progressively stronger, or the positive refractive power becomes progressively weaker. With this, the higher order spherical aberrations and coma produced from the last lens surface of the front or positive part of the lens system can be removed.

It should also be pointed out that when the refractive index distribution type lens takes its place in the rear section of the positive part, that is, in front of a diaphragm, it is desirable to determine the distribution so that the positive refractive power increases with increase in the height. For this purpose, if that lens in front of the diaphragm is made of radial type refractive index distributive material, the distribution may take the form that the refractive index decreases with increases in the height. If the material is of the axial type, the distribution at the last surface may take a form that the positive refractive power increases with increase in the height. On the assumption that the rear surface of the last lens in the first lens unit, is, for example, convex toward the rear, it is desirable that the distribution along the optical axis has a form that the refractive index decreases as the rear vertex is approached. If so, the last surface of the first lens unit takes the lowest value of the refractive index at the vertex, and the highest value in the marginal zone. By constructing the last surface which plays an important role in controlling aberrations in such a form, as the curvature of the last surface weakens, the spherical aberration and coma which are ascribable to the refraction of light at the surface are minimized.

Thus, the use of a refractive index distribution type lens of the form described in the positive part of the entire system makes it possible to achieve good stabilization of spherical aberration and coma throughout the entire zooming range.

The above-described configuration of a zoom lens has another feature that the total zooming movement of the rear lens unit of negative power is longer than that of the front lens unit of positive power. When in the wide angle end, the image at the highest height is formed by a pencil of rays passing through the farthest position from the optical axis. When in the telephoto position, it is formed by a pencil of rays passing through the paraxial region. Therefore, the zoom lenses of the configuration described above when zoomed to the wide angle end generally produce large positive distortion. According to the invention, therefore, at least the negative lens part of the system is provided with at least one refractive index distribution type lens in order to stabilize distortion at a minimum against zooming. Further, for the above-described reason, curvature of field also can be corrected. As for the paraxial pencil of rays, because of that area of the negative part of the system through which the pencil passes widens when in the telephoto end, spherical aberration is produced. But the introduction of such a refractive index distribution type lens can minimize variation of spherical aberration with zooming.

This lens when positioned on the image side of a lens whose front surface is, for example, concave toward the front, is preferably given distribution of descreasing refractive indices with increases in the height from the optical axis, that is, formed to a radial type lens having the positive transit of power, or an axial type lens having increasing refractive indices from front to rear. Alternatively when positioned on the image side of a lens whose front surface is convex toward the front, the refractive index distribution type lens is either of the radial type in which the refractive index increases with increase in the height, or which has the negative transit of power, or of the axial type in which the refractive index descreases from front to rear.

Instead of the radial or axial type alone, it is also possible to use a combined type of the radial and axial ones. If the refractive index distribution is controlled with respect to the slope for each wavelength, even chromatic aberrations can be corrected.

BRIEF DESCRIPTION OF THE DRAWINGS

Odd-numbered FIGS. 1 to 19 are longitudinal section views of first to tenth embodiments of zoom lenses according to the invention respectively.

Even-numbered

DETAILED DESCRIPTION OF THE PREFERRED EMBODIMENTS

Figure 1:
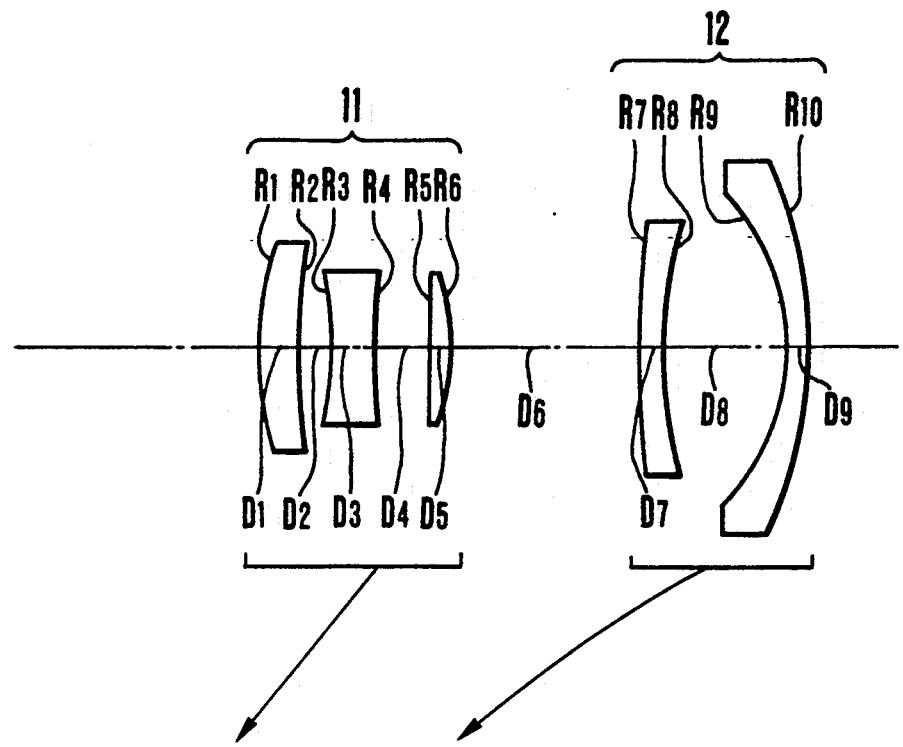

In FIG. 1 there is shown a first embodiment of the invention. This lens comprises two lens units, or, from front to rear, a positive first lens unit 11 and a negative second lens unit 12, both of which are axially movable for zooming. A first lens element in the first unit 11 is a positive meniscus lens of forward convexity which is made of refractive index distributive material along the radius. This distribution has decreasing refractive indices with increases in the height, while the slope is not uniform, but progressively gentler as the height increases. In other words, the absolute value of the differentiated refractive index by the height in the paraxial region is larger than that in the marginal zone, or the positive refractive power weakens as the height increases.

This distribution allows for the front surface of the refractive index distribution type lens to correct the spherical aberration which would be otherwise undercorrected by the last lens surface of the first unit 11 throughout the entire zooming range as in the prior art, and further the outward coma which would also be otherwise produced. The use of such a refractive index distribution type lens reduces the Petzval sum as has been described above, giving an additional advantage of correcting curvature of field. By these, it is realized a zoom lens well corrected for aberrations from the wide angle to the telephoto end.

It should be pointed out here that it is customary in the prior art of zoom lenses of such a type as in this embodiment that for an equivalent zooming range, the first lens unit is constructed with more than four lens elements. In the embodiment of the invention, however, the introduction of the refractive index distribution type lens of such form that the refractive index decreases with increases in the height from the optical axis enables the axial thickness of the first lens unit to be made shorter than was heretofore possible by an amount corresponding to the simplified structure of construction, thus producing still another advantage of shortening the optical total length of the entire system.

Figure 3:
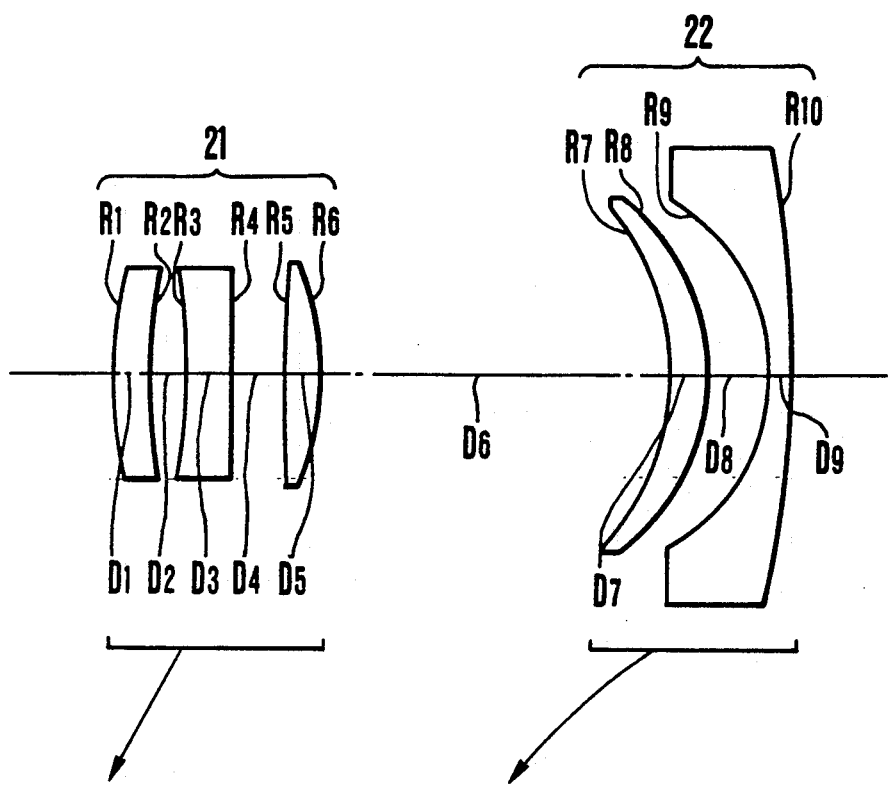
Figure 2A:
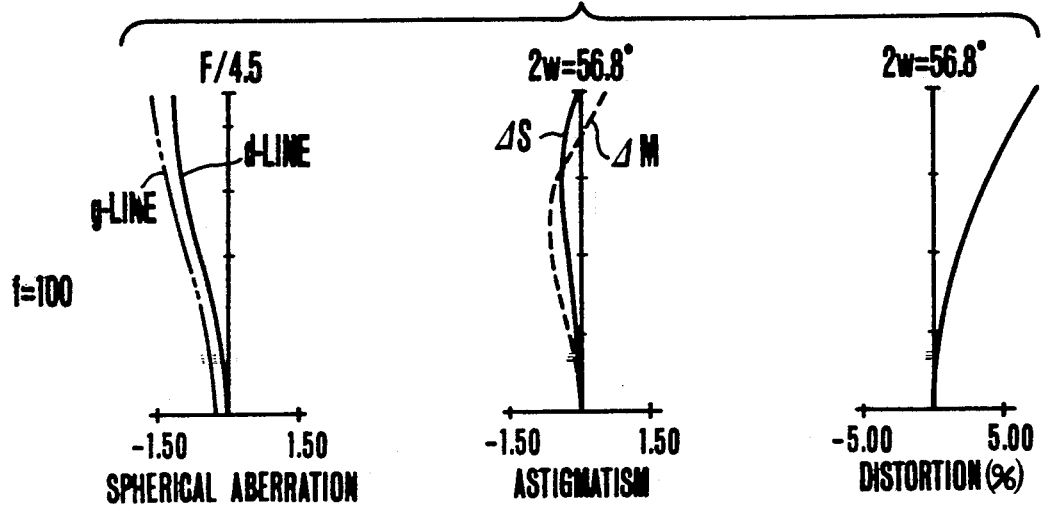
FIGS. 2A-2C to 20A-20C are graphic representations of the aberrations of the first to tenth embodiments respectively.
Figure 2B:
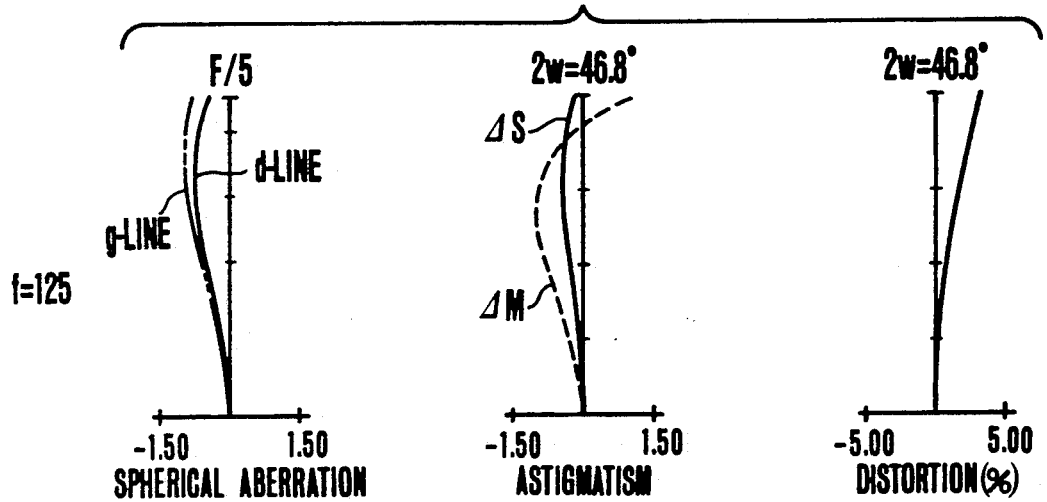
Figure 2C:
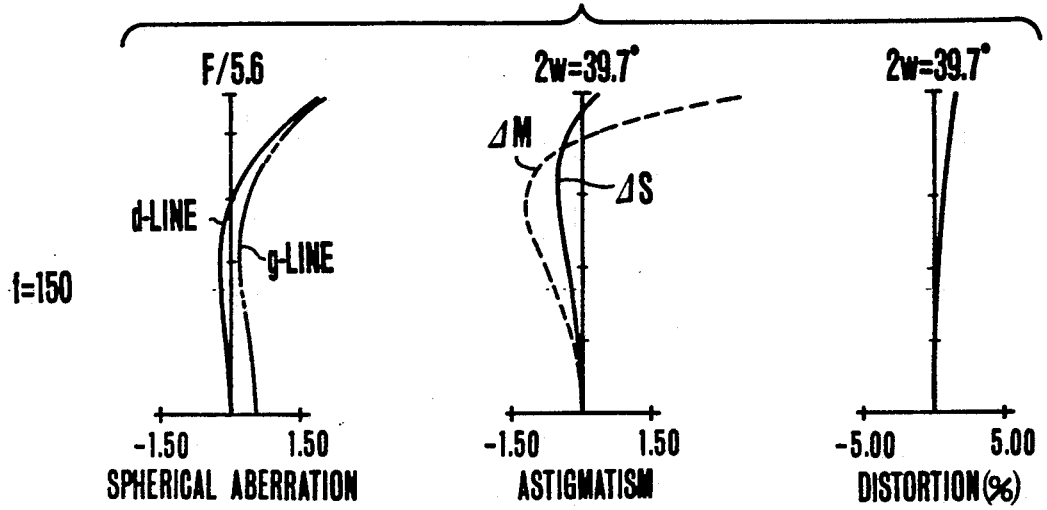
Figure 4A:
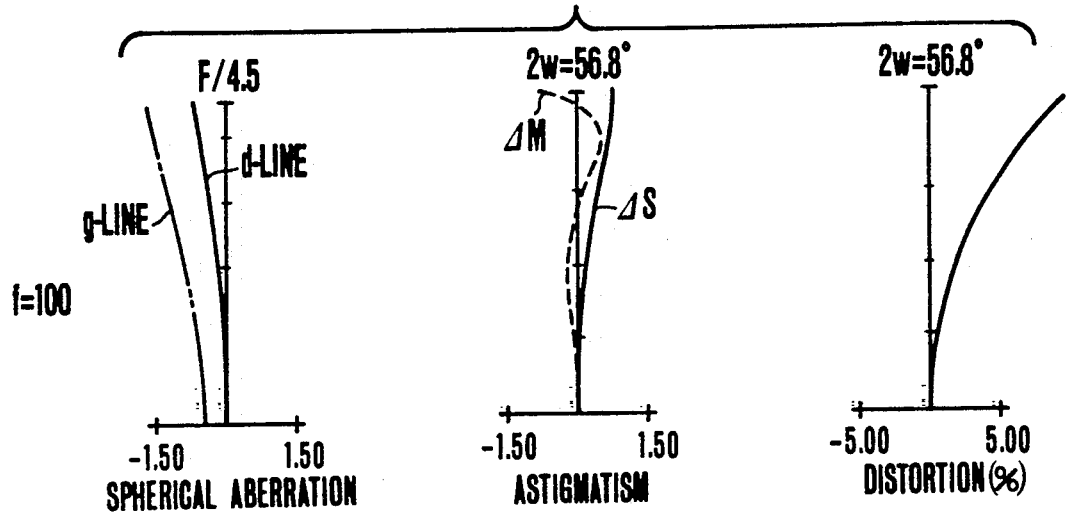
Figure 4B:
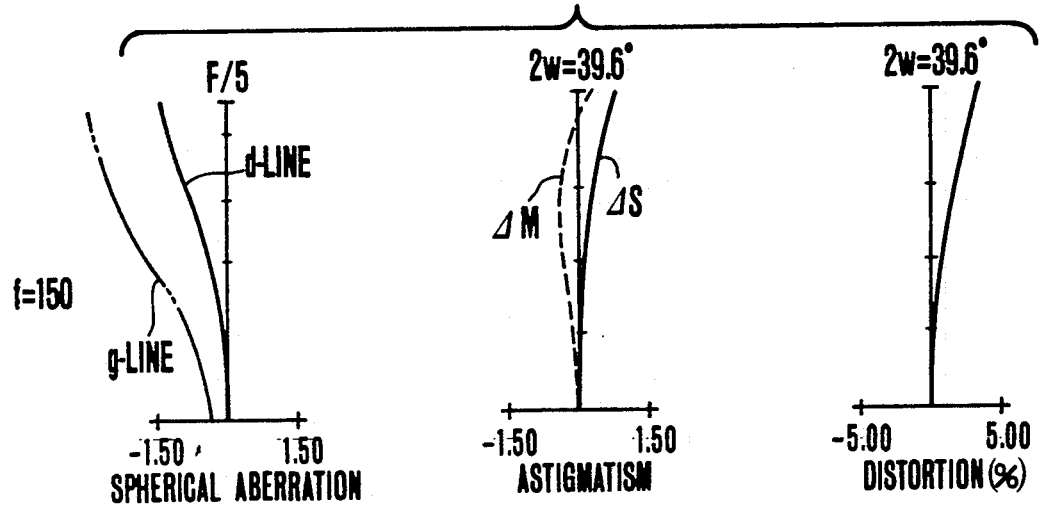
Figure 4C:
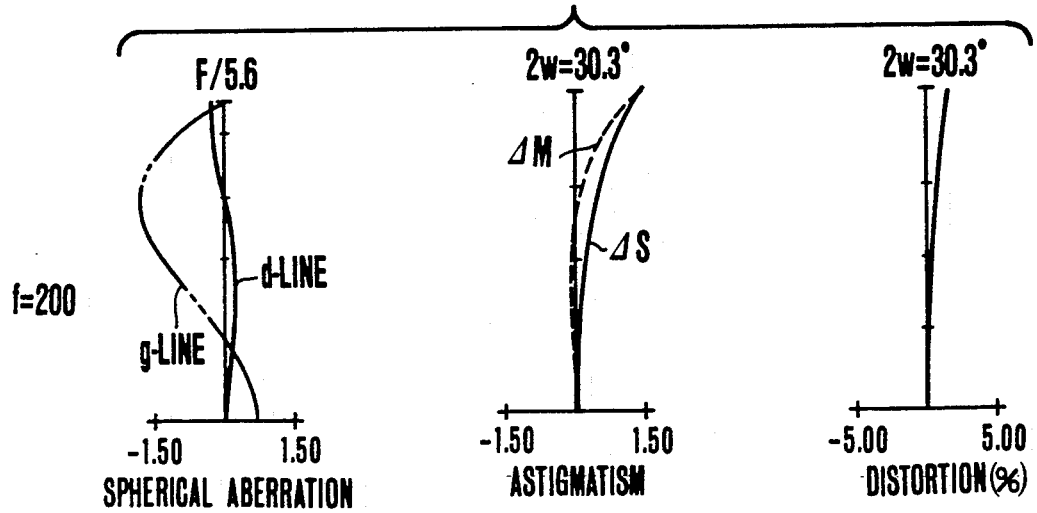

A second embodiment is shown in FIG. 3 where the zoom lens comprises two lens units 21 and 22. The first lens unit 21 includes a positive meniscus first lens of forward convexity which is made of refractive index distributive material of the radial type, and a bi-convex third lens which is made of refractive index distributive material of the axial type. And, the zooming range is extended to $2\omega = 56.8° -30.3°$. It is in the first lens that the distribution has a form that the refractive index increases with increases in the height, and the differentiated value of refractive index with respect to the height in the marginal zone is larger than that in the paraxial zone, or the negative refractive power in the marginal zone is stronger than in the paraxial zone. It is in the third lens that the refractive index decreases with increases in the axial distance from the front vertex so that the refractive power just ahead the rear surface in the marginal zone is stronger than in the paraxial zone.

As the rear surface of the third lens of the first lens unit 21 produces spherical aberration and outward coma, though these aberrations are corrected to some extent by the refractive index distribution in the third lens, there are yet left under-corrected spherical aberration and outward coma which are corrected by the refractive index distribution of the first positive meniscus lens. Also the under-corrected astigmatism $\Delta M$-$\Delta S$ which is liable to be produced from the last lens surface of the first lens unit particularly when in the telephoto position, is corrected by the refractive index distribution of the first positive meniscus lens, so that the duty of the second lens unit for correcting it is reduced. By this arrangement it is made possible to provide a zoom lens well corrected for aberrations from the wide angle to the telephoto end.

Figure 5:
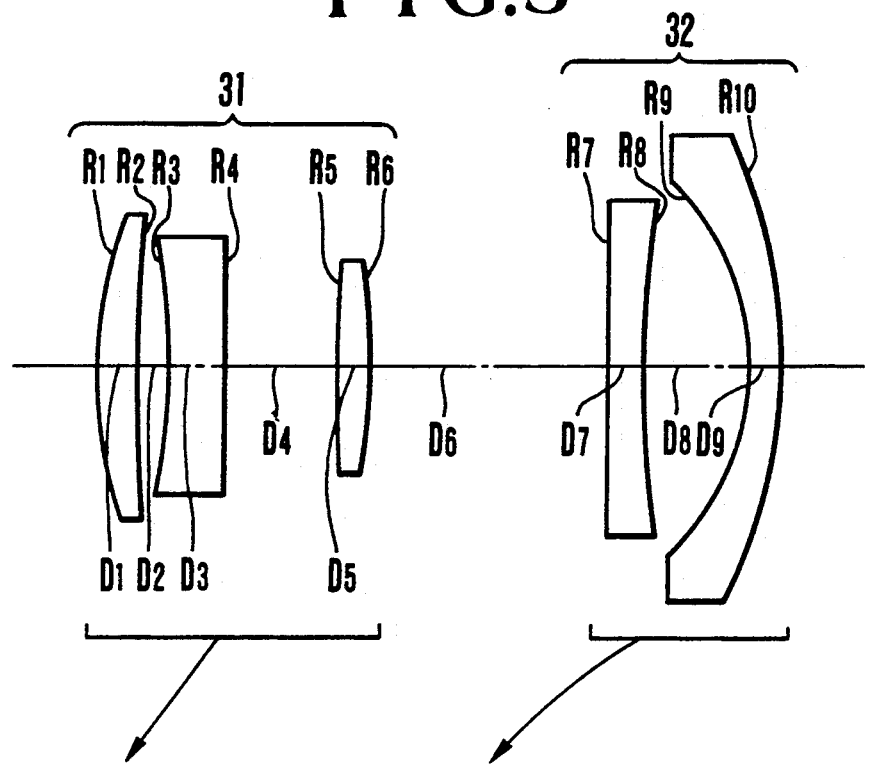

A third embodiment of FIG. 5 is comprised of two lens units. A bi-concave lens of the first lens unit 31 is made of an axial distribution of refractive indices.

This distribution has a form that the refractive index decreases with increases in the axial distance from the front bevel to the rear bevel. It is just behind the front surface which is stronger in curvature than the rear surface that the refractive index in the marginal zone is higher than in the paraxial zone, or that the negative refractive power increases with increases in the height.

In the prior art, particularly when in the telephoto end, spherical aberration tends to be under-corrected. This becomes possible to correct by the front surface of the refractive index distribution type lens.

Figure 7:
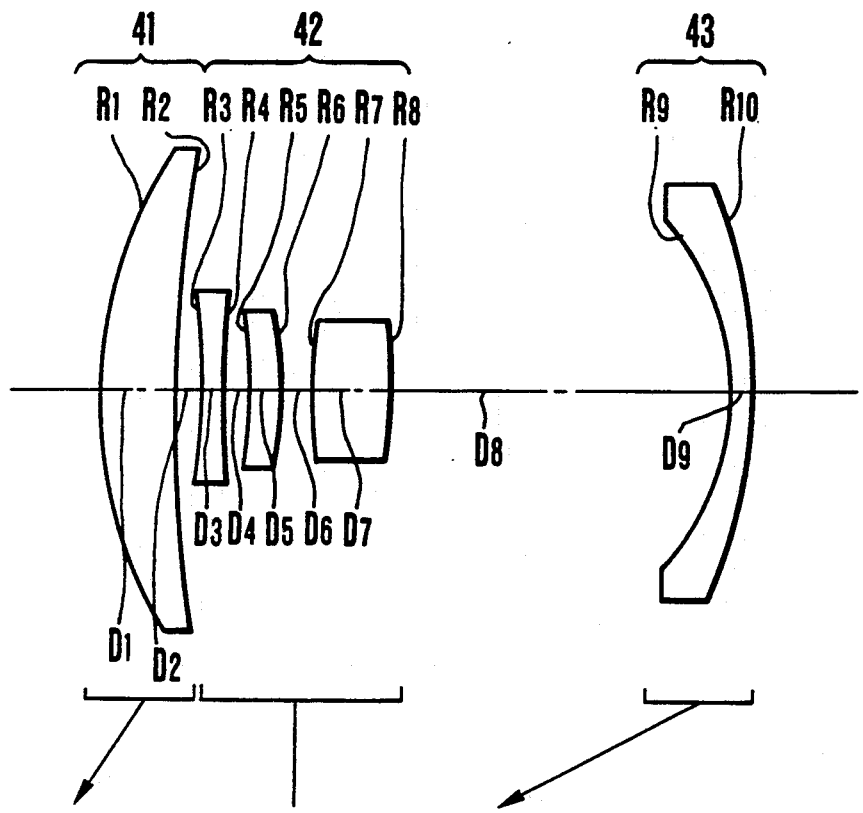
Figure 6A:
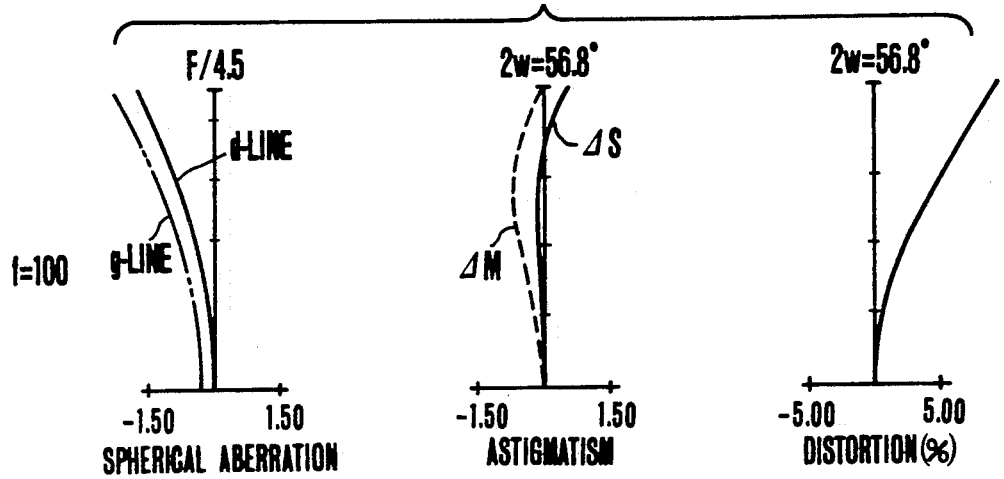
Figure 6B:
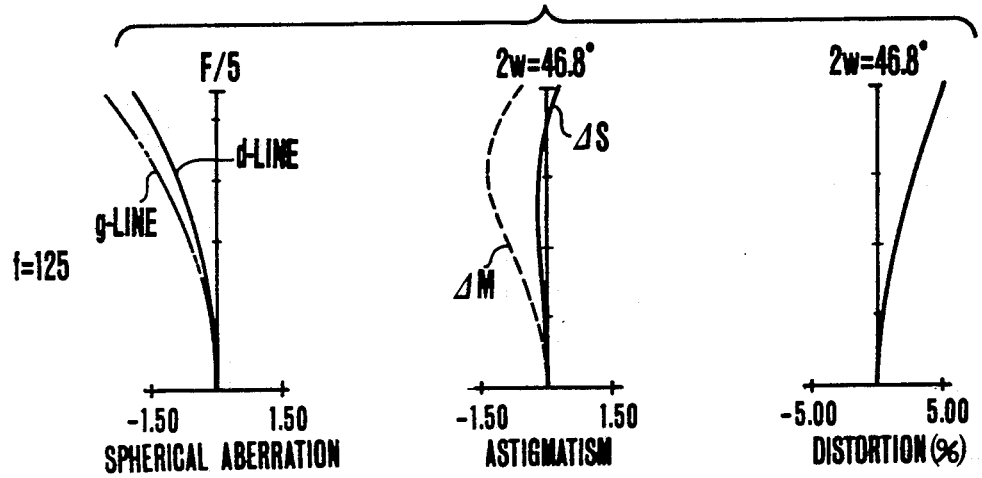
Figure 6C:
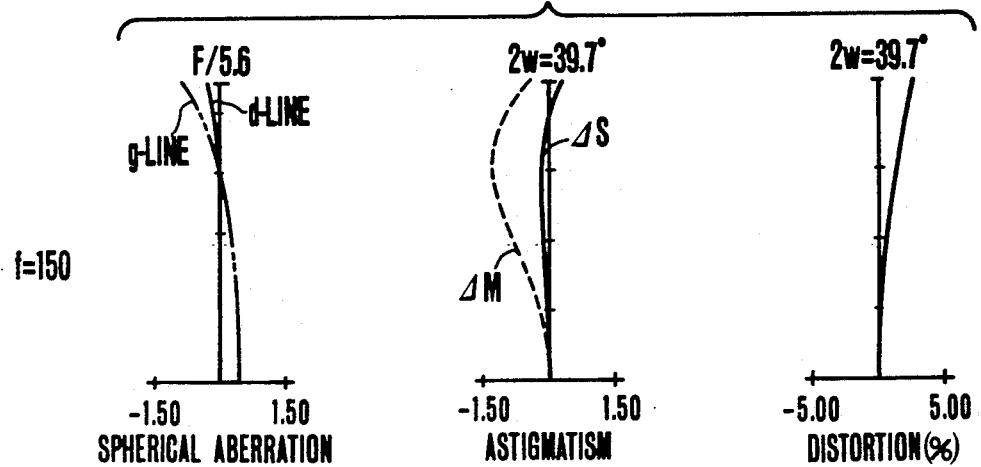
Figure 8A:
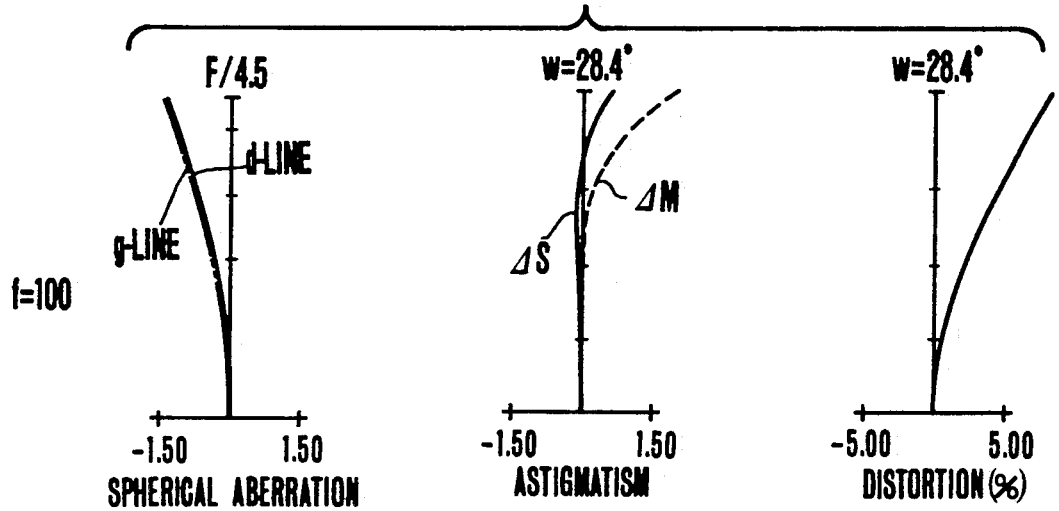
Figure 8B:
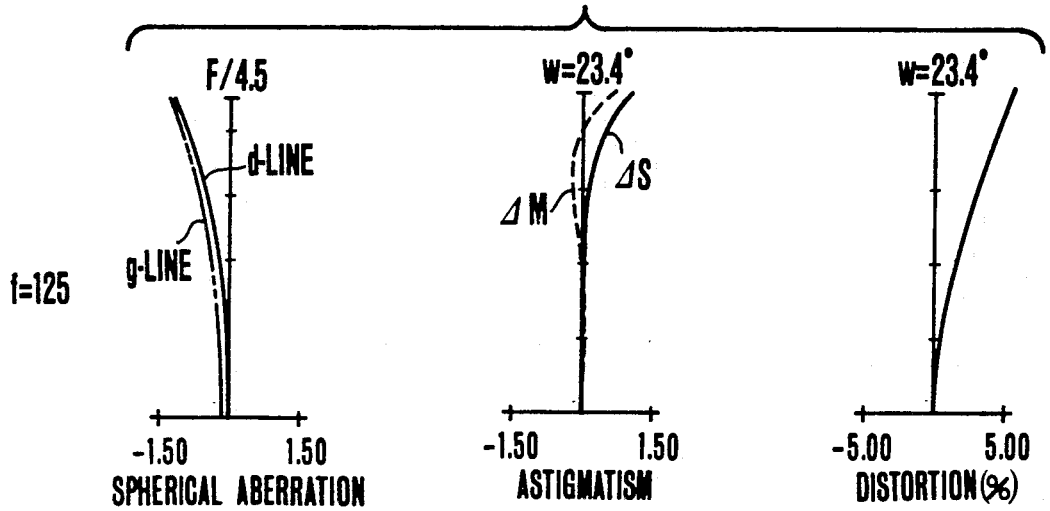
Figure 8C:
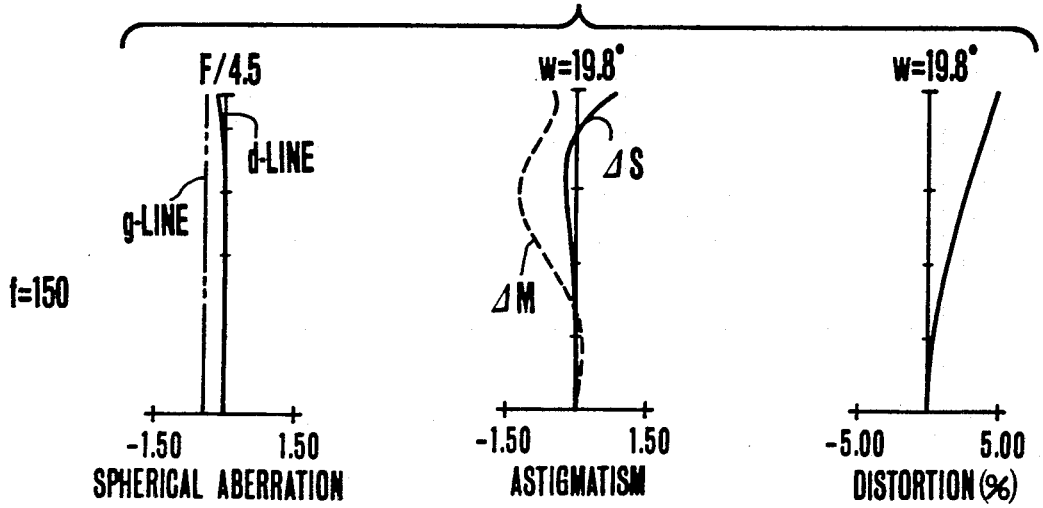

A fourth embodiment of FIG. 7 includes a first sub lens unit 42 which does not move during zooming on the image side of a positive first lens unit 41, zooming being performed by varying the separation between the movable first lens unit 41 and another movable or second lens unit 43. A positive meniscus lens of forward convexity in the first lens unit 41 is made of a radial distribution of refractive indices. This distribution has a form that the refractive index increases with increases in the height, and the slope in the marginal zone is steeper than in the paraxial zone. That is, the differentiated value of refractive index with respect to the height is larger in the marginal zone than in the paraxial zone, and the negative refractive power in the marginal zone is stronger than in the paraxial zone.

The under-corrected spherical aberration and outward coma which are ascribable mainly to the last lens surface of the first sub lens unit 42 are corrected over the entire zooming range by the interior variation of the refractive index in the refractive index distribution type lens. Also, the under-corrected astigmatism ($\Delta M$-$\Delta S$) produced from the last surface of the first sub lens unit 42 is corrected in the interior of the refractive index distribution type lens. By these, it is made possible to provide a zoom lens well corrected for aberrations from the wide angle to the telephoto end.

Figure 9:
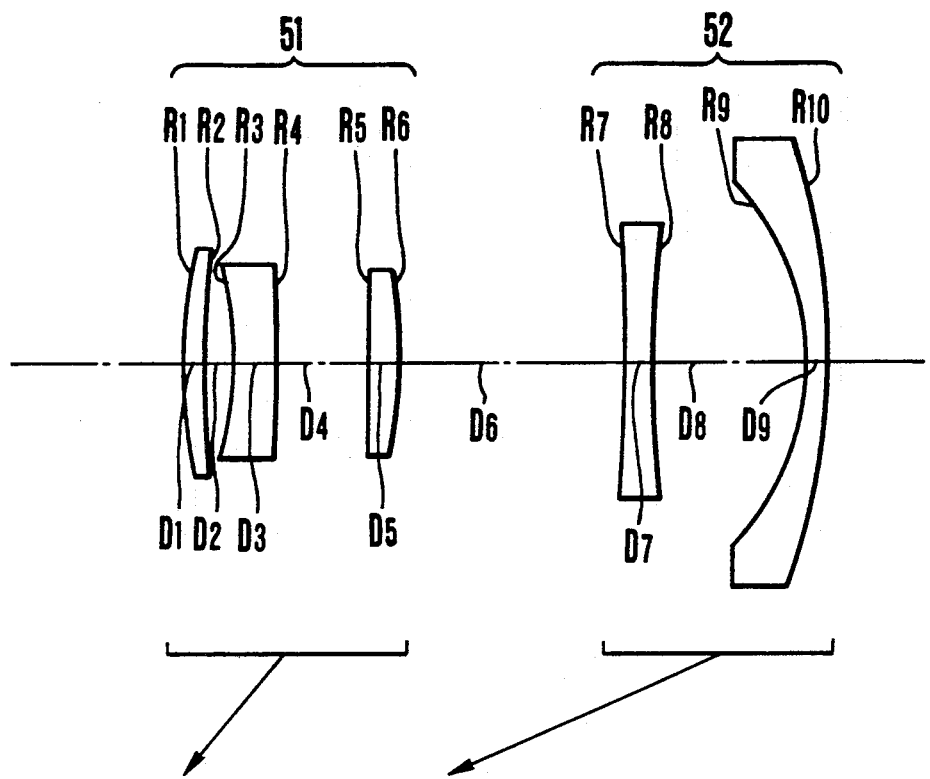

A fifth embodiment of FIG. 9 is comprised of two lens units, wherein a bi-convex lens in the first lens unit 51 is made of a radial distribution of refractive indices.

This distribution has a form that the refractive index descreases with increases in the height, representing a positive power distribution. Therefore, the curvature of the last surface of the first lens unit which produces large aberrations can be weakened to facilitate correction of aberrations.

In the prior art, the last surface of the first lens unit produces under-corrected spherical aberration. In the invention, however, the spherical aberration is corrected over the entire zooming range by the rear surface of the bi-convex lens of refractive index distribution. Also as to curvature of field, the Petval sum is reduced by the refractive power of the refractive index distribution type lens, and variation of aberrations with zooming is corrected to a minimum.

By these it is made possible to provide a zoom lens well corrected for aberrations from the wide angle to the telephoto end.

When the above-stated features are satisfied, a compact zoom lens with a reduced total number of lens elements while still permitting good stability of aberration correction throughout the zooming range is realized.

In the following, numerical examples are described. Ri is the radius of curvature of the lens surface, Di is the lens thickness or separation between the successive surfaces, Ni is the refractive index, Vi is the Abbe number. Also, h is the height from the optical axis, x is the axial distance. F is the focal length, $\omega$ is the image angle, and $\lambda$ is the wavelength.

NUMERICAL EXAMPLE 1 (FIGS. 1 AND 2A-2C)

| F = 100-150 FNO = 1:4.5-5.6 2$\omega$ = 56.8°-39.7° | | | |
|---|---|---|---|
| R 1 = 75.929 | D1 = 6.37 | N1 = N(h) | |
| R 2 = 125.570 | D2 = 5.85 | | |
| R 3 = −101.074 | D3 = 7.88 | N2 = 1.71736 | $\nu$2 = 29.5 |
| R 4 = 268.591 | D4 = 9.52 | | |
| R 5 = 495.805 | D5 = 3.75 | N3 = 1.62680 | $\nu$3 = 56.5 |
| R 6 = −48.717 | D6 = Variable | | |
| R 7 = 159.933 | D7 = 5.00 | N4 = 1.60311 | $\nu$4 = 60.7 |
| R 8 = 97.492 | D8 = 22.79 | | |
| R 9 = −33.692 | D9 = 3.75 | N5 = 1.61800 | $\nu$5 = 63.7 |
| R10 = −82.971 | | | |

| | F | 100 | 125 | 150 |
|---|---|---|---|---|
| | D6 | 33.8 | 19.4 | 9.7 |

| $N(h) = N_0 + N_1 h^2 + N_2 h^4 + N_3 h^6 + N_4 h^8 + \cdots$ | | | | |
|---|---|---|---|---|
| $\lambda$ | $N_0$ | $N_1$ | $N_2$ | $N_3$ |
| N(h) d | 1.77250 | $-2.00139 \times 10^{-4}$ | $5.03496 \times 10^{-8}$ | $3.40355 \times 10^{-10}$ |
| g | 1.79193 | $-2.00139 \times 10^{-4}$ | $5.03496 \times 10^{-8}$ | $3.40355 \times 10^{-10}$ |

NUMERICAL EXAMPLE 2 (FIGS. 3 and 4A-4C)

| \multicolumn{4}{c}{F = 100-200 FNO = 1:4.5-5.6 2ω = 56.8°-30.3°} |
|---|---|---|---|
| R 1 = 84.428 | D1 = 6.83 | N1 = N(h) | |
| R 2 = 129.633 | D2 = 6.01 | | |
| R 3 = −99.596 | D3 = 7.67 | N2 = 1.717360 | $\nu 2$ = 29.5 |
| R 4 = 19847.175 | D4 = 9.34 | | |
| R 5 = 1097.688 | D5 = 6.26 | N3 = N(x) | |
| R 6 = −48.202 | D6 = Variable | | |
| R 7 = −43.256 | D7 = 6.50 | N4 = 1.717360 | $\nu 4$ = 29.5 |
| R 8 = −36.492 | D8 = 10.00 | | |
| R 9 = −35.573 | D9 = 3.75 | N5 = 1.701540 | $\nu 5$ = 41.2 |
| R10 = −200.192 | | | |

| F | 100 | 150 | 200 |
|---|---|---|---|
| D6 | 61.5 | 38.1 | 26.4 |

$$N(h) = N_0 + N_1 h^2 + N_2 h^4 + N_3 h^6 + \ldots$$
$$N(x) = N_0 + N_1 x + N_2 x^2 + N_3 x^3 + \ldots$$

| | λ | $N_0$ | $N_1$ | $N_2$ | $N_3$ | $N_4$ |
|---|---|---|---|---|---|---|
| N(h) | d | 1.77250 | $-2.21492 \times 10^{-5}$ | $2.22757 \times 10^{-7}$ | $1.61264 \times 10^{-10}$ | $3.28907 \times 10^{-13}$ |
| | g | 1.79193 | $-1.64385 \times 10^{-5}$ | $1.89956 \times 10^{-7}$ | $3.02218 \times 10^{-10}$ | $2.38641 \times 10^{-13}$ |
| N(x) | d | 1.69780 | $-1.09877 \times 10^{-3}$ | $9.56637 \times 10^{-6}$ | $1.00070 \times 10^{-7}$ | |
| | g | 1.71205 | $-7.35429 \times 10^{-4}$ | $-6.71156 \times 10^{-7}$ | $9.05102 \times 10^{-9}$ | |

NUMERICAL EXAMPLE 3 (FIGS. 5 and 6A-6C)

| \multicolumn{4}{c}{F = 100-150 FNO = 1:4.5-5.6 2ω = 56.8°-39.7°} |
|---|---|---|---|
| R 1 = 56.052 | D1 = 5.66 | N1 = 1.75500 | $\nu 1$ = 52.3 |
| R 2 = 197.064 | D2 = 4.24 | | |
| R 3 = −81.387 | D3 = 7.30 | N2 = N(x) | |
| R 4 = 817.456 | D4 = 14.75 | | |
| R 5 = 118.175 | D5 = 4.80 | N3 = 1.69680 | $\nu 3$ = 56.5 |
| R 6 = −78.874 | D6 = Variable | | |
| R 7 = 790.865 | D7 = 5.00 | N4 = 1.60311 | $\nu 4$ = 60.7 |
| R 8 = 144.497 | D8 = 14.86 | | |
| R 9 = −30.568 | D9 = 3.75 | N5 = 1.61800 | $\nu 5$ = 63.4 |
| R10 = −69.479 | | | |

| F | 100 | 125 | 150 |
|---|---|---|---|
| D6 | 32.34 | 22.52 | 15.97 |

$$N(x) = N_0 + N_1 x + N_2 x^2 + N_3 x^3 + \ldots$$

| | λ | $N_0$ | $N_1$ | $N_2$ | $N_3$ | $N_4$ |
|---|---|---|---|---|---|---|
| N(x) | d | 1.74077 | $-7.29513 \times 10^{-3}$ | $9.2487 \times 10^{-7}$ | $-1.43877 \times 10^{-7}$ | $1.68544 \times 10^{-9}$ |
| | g | 1.77589 | $-2.53409 \times 10^{-3}$ | $-2.82862 \times 10^{-6}$ | $-4.58365 \times 10^{-8}$ | $-3.84637 \times 10^{-9}$ |

NUMERICAL EXAMPLE 4 (FIGS. 7 and 8A-8C)

| \multicolumn{4}{c}{F = 100-150 FNO = 1:4.5 2ω = 56.8°-39.6°} |
|---|---|---|---|
| R 1 = 64.529 | D1 = 14.48 | N1 = N(h) | |
| R 2 = 239.663 | D2 = Variable | | |
| R 3 = −101.474 | D3 = 4.06 | N2 = 1.75520 | $\nu 2$ = 27.5 |
| R 4 = 185.957 | D4 = 4.69 | | |
| R 5 = −56.168 | D5 = 5.30 | N3 = 1.77250 | $\nu 3$ = 49.6 |
| R 6 = −59.069 | D6 = 5.15 | | |
| R 7 = 88.121 | D7 = 14.11 | N4 = 1.69350 | $\nu 4$ = 53.2 |
| R 8 = −103.911 | D8 = Variable | | |
| R 9 = −39.232 | D9 = 2.70 | N5 = 1.77250 | $\nu 5$ = 49.6 |
| R10 = −88.791 | | | |

| F | 100 | 125 | 150 |
|---|---|---|---|
| D2 | 4.7 | 16.8 | 29.1 |
| D8 | 61.0 | 41.7 | 25.8 |

$$N(h) = N_0 + N_1 h^2 + N_2 h^4 + N_3 h^6 + \ldots$$

| | λ | $N_0$ | $N_1$ | $N_2$ | $N_3$ | $N_4$ |
|---|---|---|---|---|---|---|
| N(h) | d | 1.75500 | $1.55066 \times 10^{-6}$ | $4.79936 \times 10^{-9}$ | $-3.68694 \times 10^{-12}$ | $4.07973 \times 10^{-15}$ |
| | g | 1.77296 | $3.71719 \times 10^{-6}$ | $5.29065 \times 10^{-9}$ | $1.14263 \times 10^{-12}$ | $1.80710 \times 10^{-15}$ |

NUMERICAL EXAMPLE 5 (FIGS. 9 and 10A-10C)

| \multicolumn{4}{c}{F = 100-150 FNO = 1:4.5-5.6 2ω = 56.8°-39.6°} |
|---|---|---|---|
| R 1 = 69.669 | D1 = 3.64 | N1 = 1.75500 | $\nu 1$ = 52.3 |

-continued

| | | | |
|---|---|---|---|
| R 2 = 260.120 | D2 = 4.54 | | |
| R 3 = −57.115 | D3 = 7.06 | N2 = 1.74077 | ν2 = 27.8 |
| R 4 = −221.433 | D4 = 14.12 | | |
| R 5 = 486.739 | D5 = 5.46 | N3 = N(h) | |
| R 6 = −59.520 | D6 = Variable | | |
| R 7 = −234.364 | D7 = 5.00 | N4 = 1.60311 | ν4 = 60.7 |
| R 8 = 283.875 | D8 = 23.38 | | |
| R 9 = −41.328 | D9 = 3.75 | N5 = 1.61800 | ν5 = 63.4 |
| R10 = −108.239 | | | |

| F | 100 | 125 | 150 |
|---|---|---|---|
| D6 | 35.6 | 25.8 | 19.3 |

$N(h) = N_0 + N_1 h^2 + N_2 h^4 + N_3 h^6 + N_4 h^8 + \ldots$

| λ | | $N_0$ | $N_1$ | $N_2$ | $N_3$ | $N_4$ |
|---|---|---|---|---|---|---|
| N(h) | d | 1.69680 | $-1.96183 \times 10^{-4}$ | $-2.46399 \times 10^{-7}$ | $-2.13052 \times 10^{-10}$ | $-1.86551 \times 10^{-12}$ |
| | g | 1.71205 | $-1.97221 \times 10^{-4}$ | $-2.43052 \times 10^{-7}$ | $-2.21523 \times 10^{-10}$ | $-1.63196 \times 10^{-12}$ |

Figure 11:
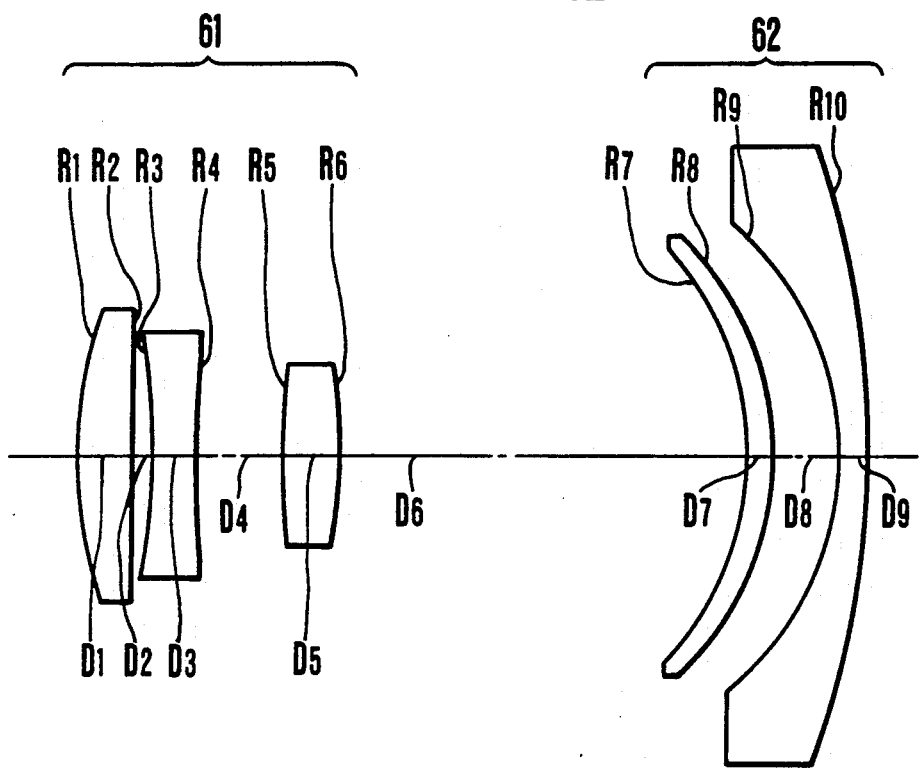
Figure 10A:
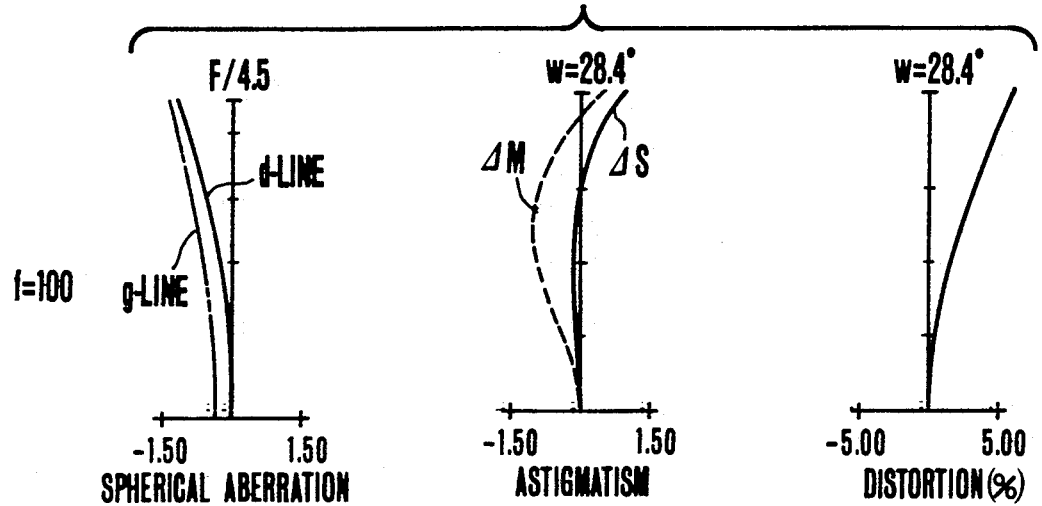
Figure 10B:
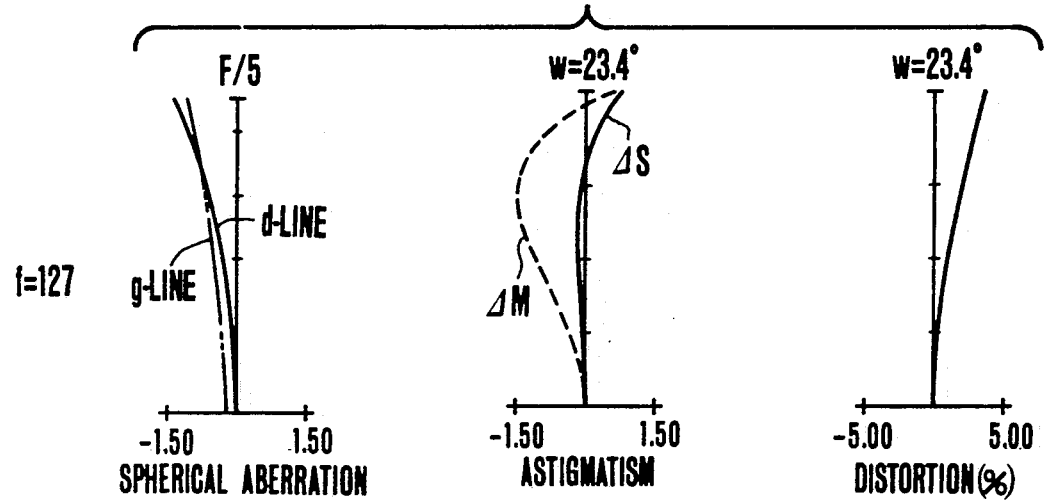
Figure 10C:
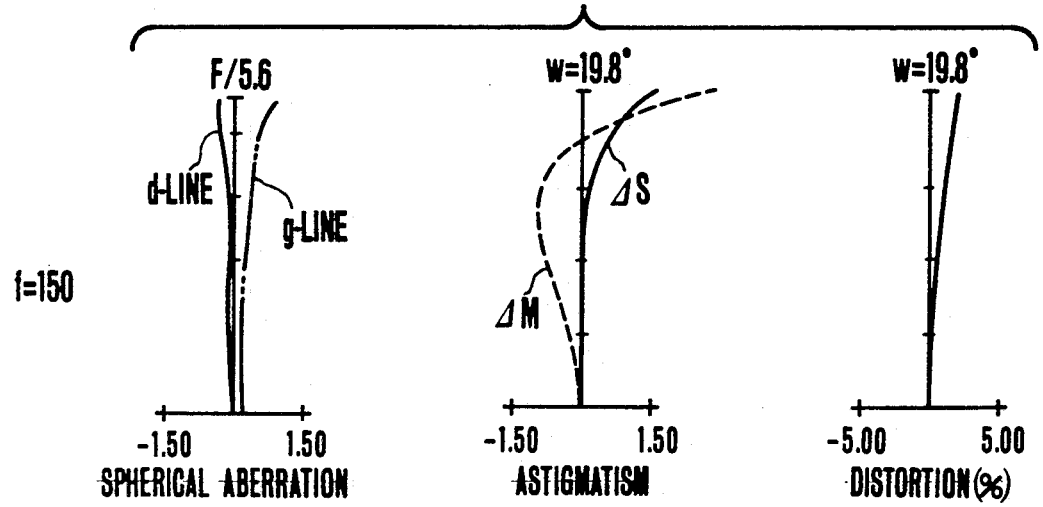
Figure 12A:
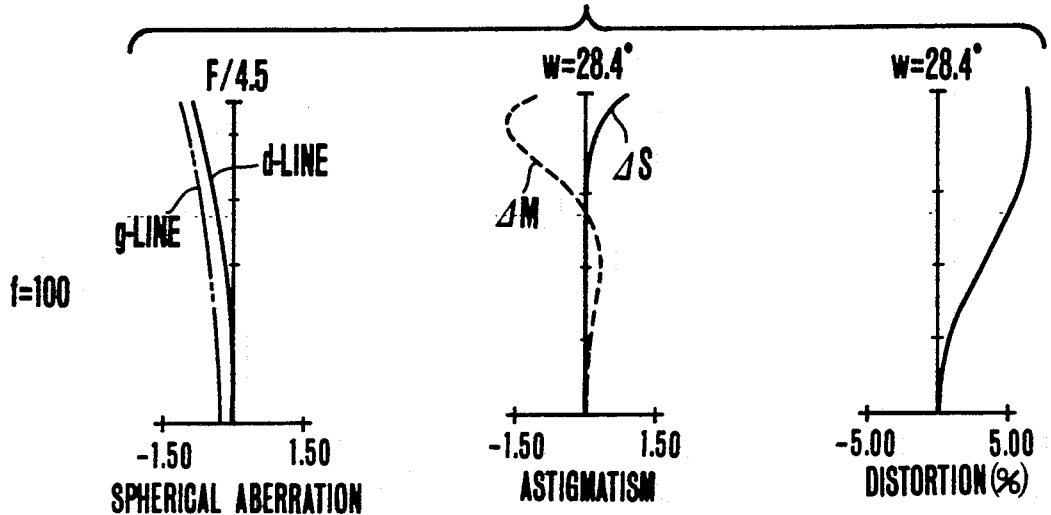
Figure 12B:
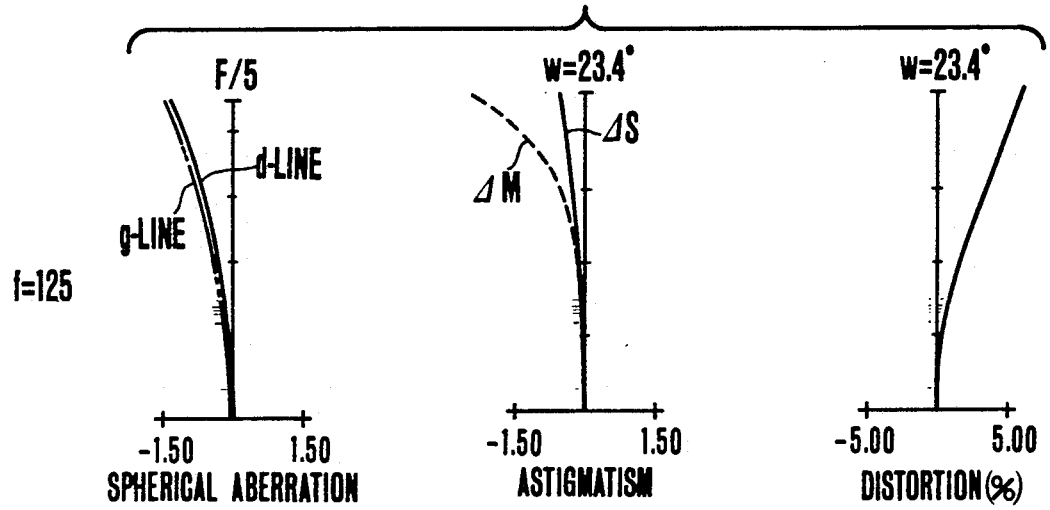
Figure 12C:
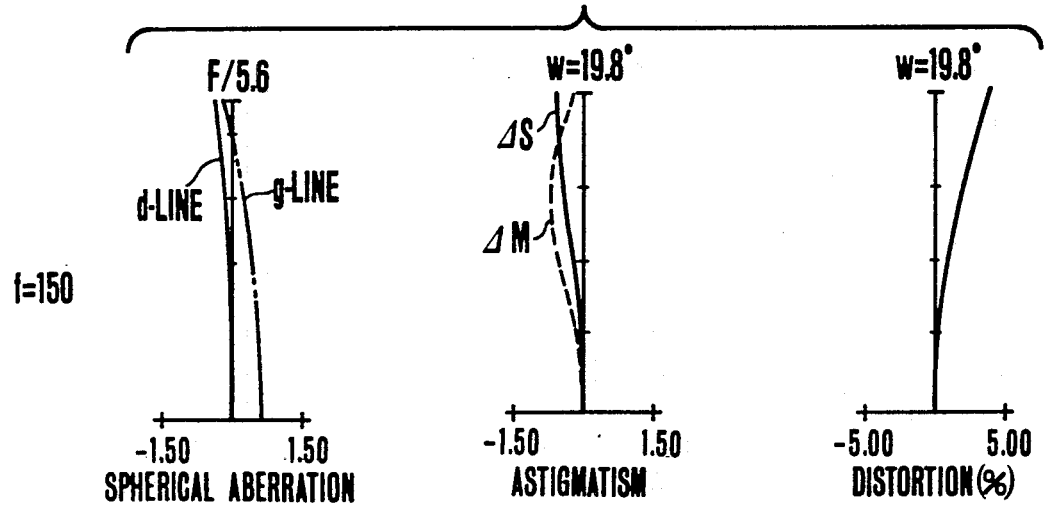

A sixth embodiment of the zoom lens (FIG. 11) comprises, from front to rear, a first lens unit 61 of positive power and a second lens unit 62 of negative power. The second lens unit 62 is constructed with two lens elements of which the first counting from the front has of a radial distribution of refractive indices having the positive transit of power. The first and second units 61 and 62 moves axially to effect zooming. Here, the use of such a refractive index distribution type lens reduces astigmatism which would otherwise increase in the marginal zone when in the wide angle end. Also, in the zoom lens of this kind, the last surface R6 of the first lens unit 61 when zoomed to the telephoto end affects spherical aberration toward under-correction. The transit power in the interior of the refractive index distribution type lens corrects it toward over-correction. As will be seen from FIGS. 12A-12C, aberrations can be maintained stable throughout the entire zooming range.

The shape of refractive index distribution of the refractive index distribution type lens can be expressed by an equation (1) or (2) below:

$$N(h) = N_0 + N_1 h^2 + N_2 h^4 + N_3 h^6 + \quad (1)$$

$$N(x) = N_0 + N_1 x + N_2 x^2 + N_3 x^3 \quad (2)$$

Here, equation (1) represents the refractive index distribution of the radial type refractive index distributive lens, where h is the height from the optical axis, $N_0$, $N_1$, $N_2$, $N_3$, ... are constants. Also equation (2) represents the refractive index distribution in the axial type refractive index distributive lens, where x is the distance from the front vertex toward the rear along the optical axis, $N_0$, $N_1$, $N_2$, $N_3$, ... are constants. These distribution constants in the tables are evaluated for d-line and g-line.

NUMERICAL EXAMPLE 6 (FIGS. 11 and 12A-12C)

| F = 100-150 FNO = 1:4.5-5.6 2ω = 56.8°-39.6° | | | | |
|---|---|---|---|---|
| R 1 = 64.431 | D1 = 8.78 | N1 = 1.77250 | ν1 = 49.6 |
| R 2 = −46754.320 | D2 = 2.67 | | |
| R 3 = −100.401 | D3 = 7.12 | N2 = 1.71736 | ν2 = 29.5 |
| R 4 = 151.201 | D4 = 13.83 | | |
| R 5 = 285.661 | D5 = 8.51 | N3 = 1.69680 | ν3 = 56.5 |
| R 6 = −80.254 | D6 = Variable | | |
| R 7 = −44.265 | D7 = 4.05 | N4 = N(h) | |
| R 8 = −44.277 | D8 = 10.72 | | |
| R 9 = −44.650 | D9 = 3.75 | N5 = 1.70154 | ν5 = 41.2 |
| R10 = −137.191 | | | |

| F | 100 | 125 | 150 |
|---|---|---|---|
| D6 | 62.5 | 43.6 | 31.0 |

| λ | | $N_0$ | $N_1$ | $N_2$ | $N_3$ | $N_4$ |
|---|---|---|---|---|---|---|
| N(h) | d | 1.71736 | $-4.10143 \times 10^{-5}$ | $1.25167 \times 10^{-7}$ | $4.07008 \times 10^{-12}$ | $-2.19039 \times 10^{-13}$ |
| | g | 1.44915 | $-3.40663 \times 10^{-5}$ | $-3.75228 \times 10^{-8}$ | $3.46621 \times 10^{-10}$ | $-4.10301 \times 10^{-13}$ |

Figure 13:
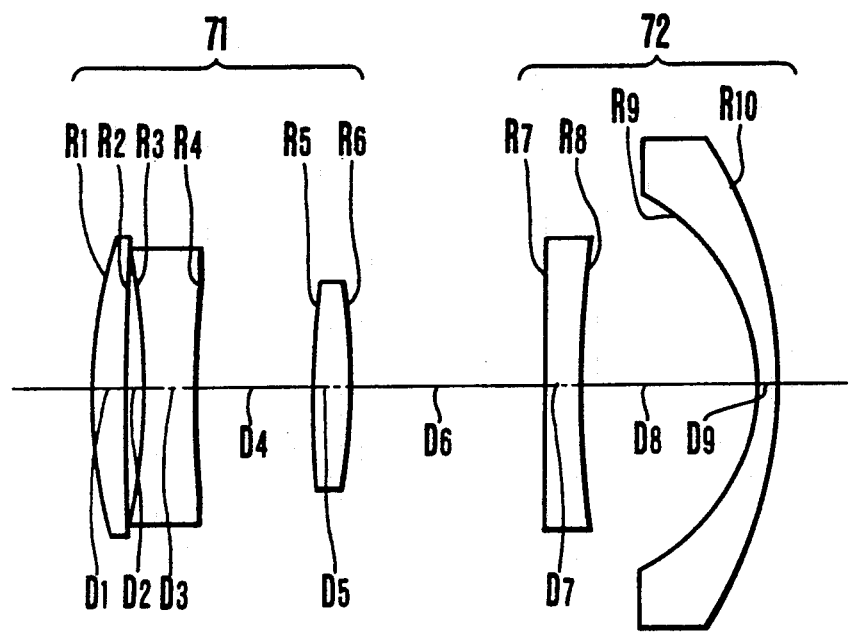

A seventh embodiment of the zoom lens shown in FIG. 13 comprises, from front to rear, a first lens unit 71 of positive power and a second lens unit 72 of negative power, the first and second lens units 71 and 72 being moved to effect zooming. The second lens unit 72 is constructed with two lens elements, of which the rear or meniscus lens is an axial type refractive index distributive lens in which the refractive index increases with increases in the axial distance from front to rear. Here, when in the wide angle end, the positive distortion usually produced from the rear surface R8 of a bi-concave lens on the object side of the refractive index distribution type lens of the second lens unit 72 and also from the front surface R9 of the meniscus lens is corrected by negative distortion produced by the refraction of rays incident on the surface R9 due to the refractive index distribution and from the interior of the refractive index distribution type lens. Also, the astigmatism in the telephoto end which is usually liable to be undercorrected by the meniscus lens of the second lens unit 72 is almost completely corrected by making it the refractive index distribution type lens and by using its surfaces R9 and R10.

NUMERICAL EXAMPLE 7 (FIGS. 13 and 14A-14C)

F = 100 - 150  FNO = 1 : 4.5 - 5.6  $2\omega = 56.8° - 39.6°$

| | | | |
|---|---|---|---|
| R 1 = 58.718 | D1 = 5.00 | N1 = 1.75500 | $\nu$1 = 52.3 |
| R 2 = 3407.865 | D2 = 2.31 | | |
| R 3 = -96.658 | D3 = 7.18 | N2 = 1.71736 | $\nu$2 = 29.5 |
| R 4 = 139.691 | D4 = 16.57 | | |
| R 5 = 110.597 | D5 = 5.24 | N3 = 1.69680 | $\nu$3 = 56.5 |
| R 6 = -85.207 | D6 = Variable | | |
| R 7 = -801.929 | D7 = 5.00 | N4 = 1.60311 | $\nu$4 = 60.7 |
| R 8 = 185.951 | D8 = 24.16 | | |
| R 9 = -27.079 | D9 = 3.75 | N5 = N(x) | |
| R10 = -51.189 | | | |

| F | 100 | 125 | 150 |
|---|---|---|---|
| D6 | 27.4 | 17.6 | 11.0 |

| $\lambda$ | $N_0$ | $N_1$ | $N_2$ | $N_3$ | $N_4$ |
|---|---|---|---|---|---|
| N(x) d | 1.61800 | $3.10661 \times 10^{-3}$ | $-9.01276 \times 10^{-5}$ | $1.24302 \times 10^{-6}$ | $-3.46162 \times 10^{-10}$ |
| g | 1.63009 | $3.03817 \times 10^{-3}$ | $-1.15710 \times 10^{-4}$ | $-4.91703 \times 10^{-7}$ | $1.69550 \times 10^{-9}$ |

Figure 15:
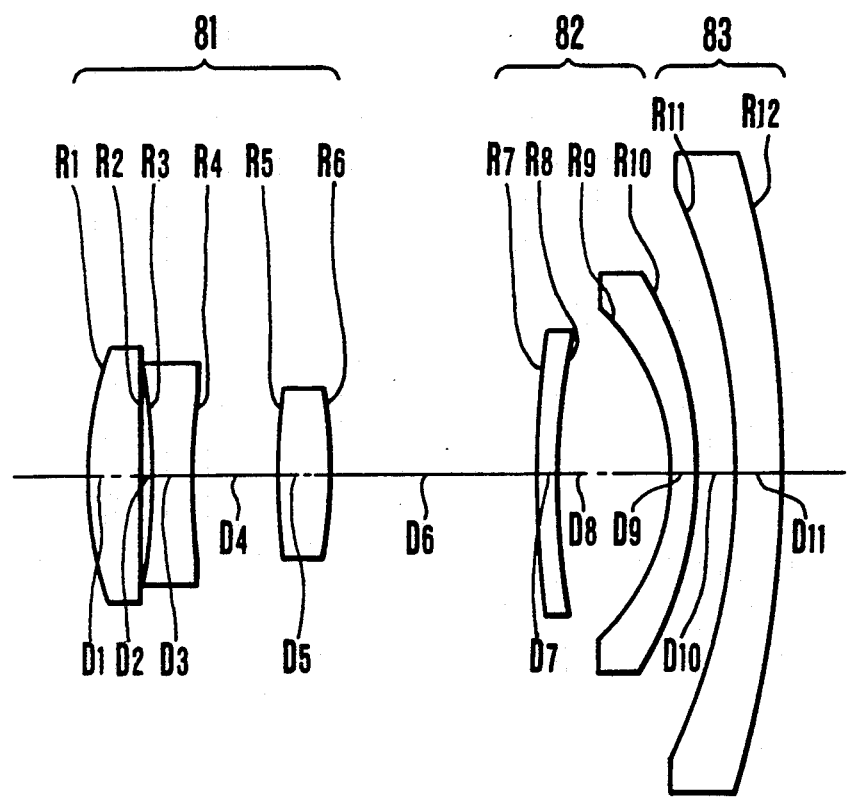
Figure 14A:
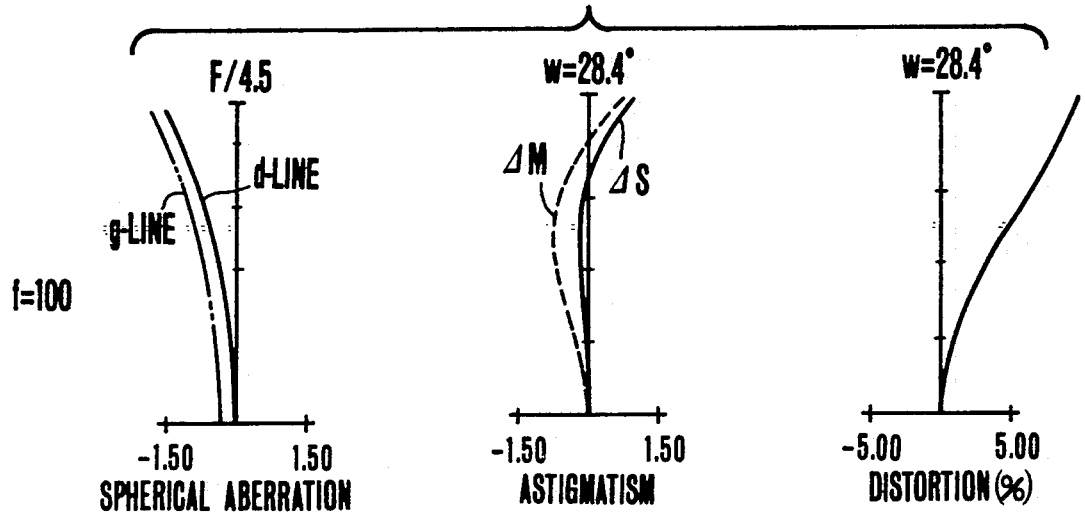
Figure 14B:
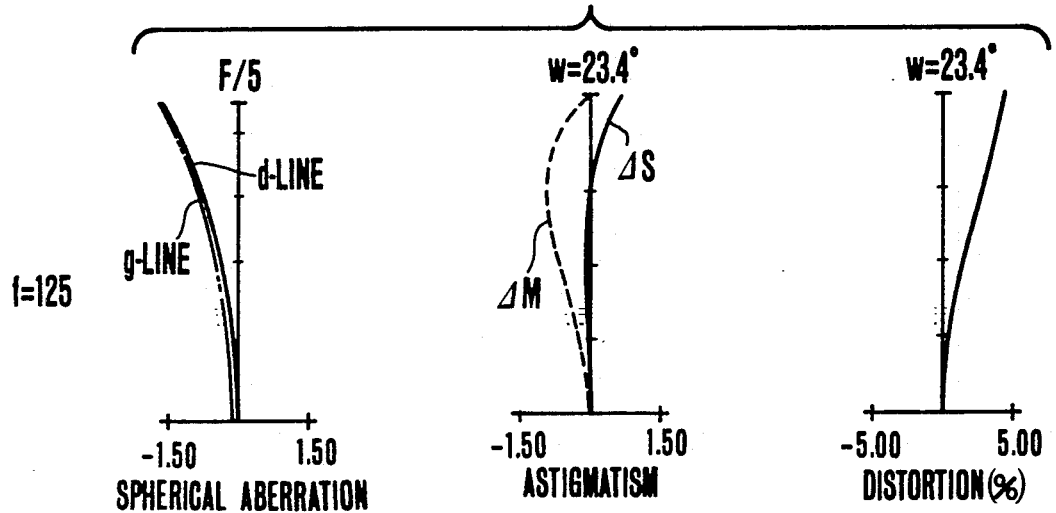
Figure 14C:
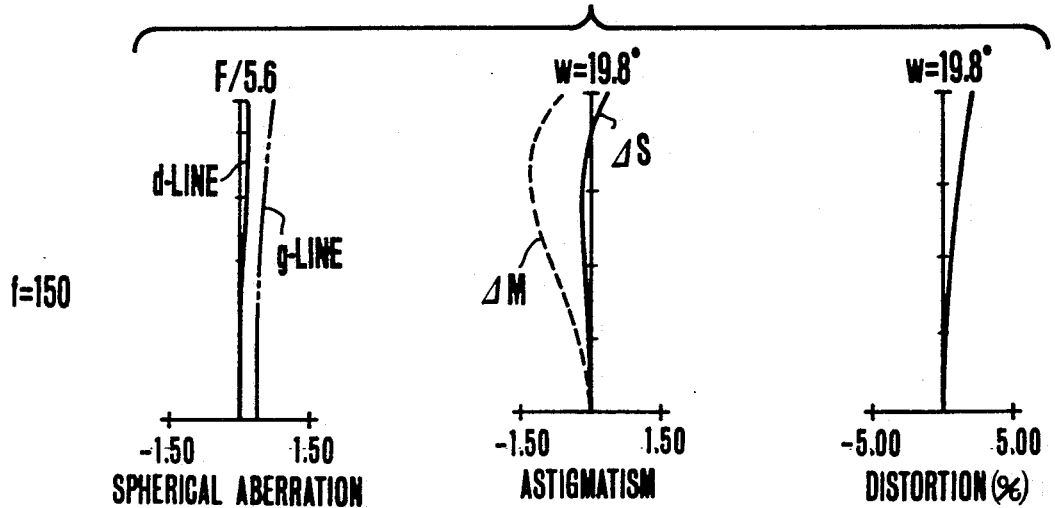
Figure 16A:
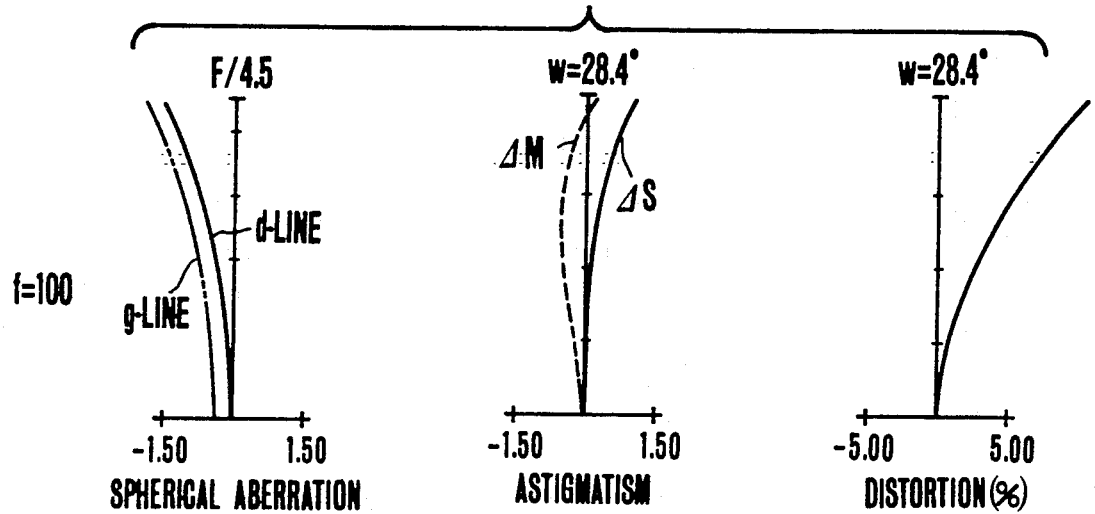
Figure 16B:
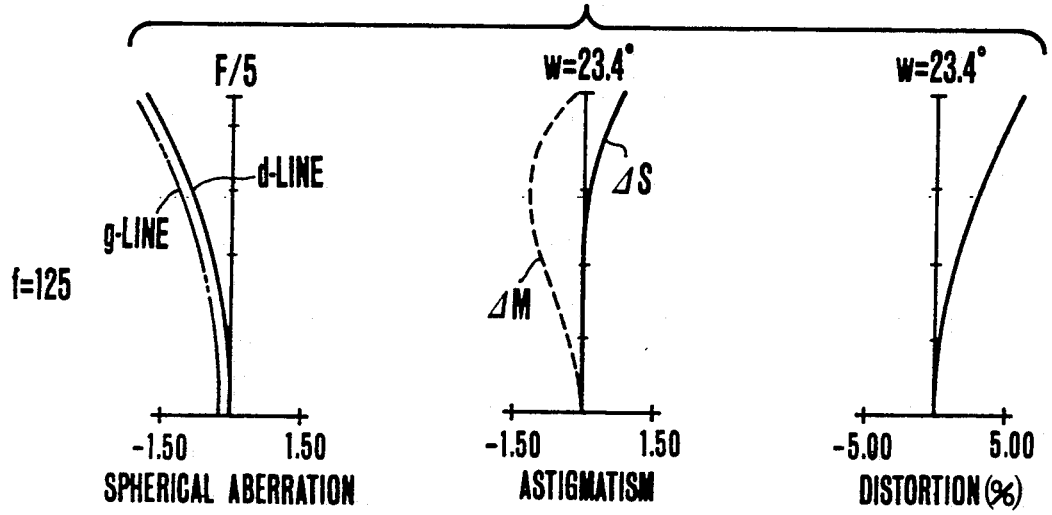
Figure 16C:
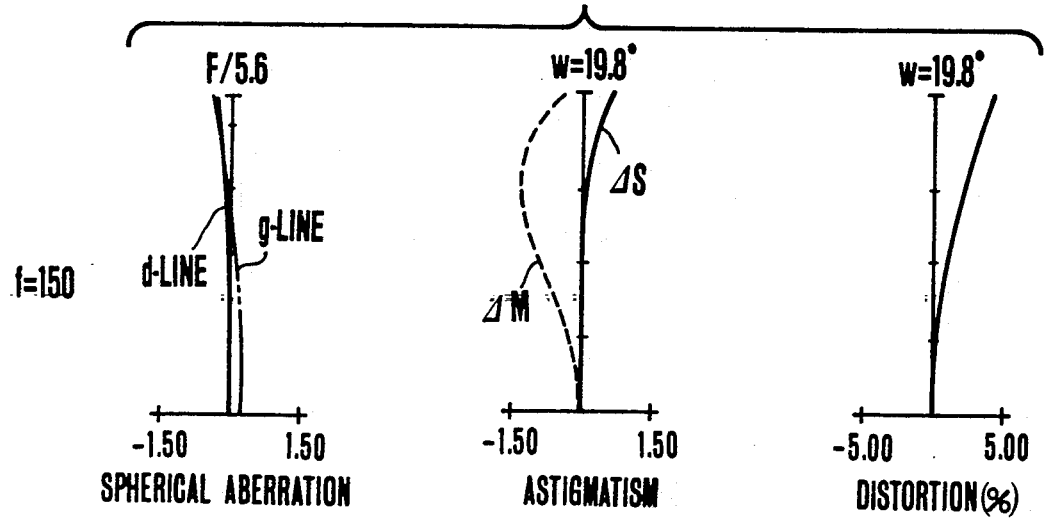

An eighth embodiment of the compact zoom lens shown in FIG. 15 comprises, from front to rear, a first lens unit 81 of positive power, a second lens unit 82 of negative power, and a third lens unit 83 of negative power, the first and second units being moved to effect zooming. The second lens unit 82 is constructed with two lens elements, of which the front is a radial type refractive index distributive lens having the negative transit of power. Here, usually when in the wide angle end, the rear surface R8 of the front or meniscus lens of forward convexity and the front surface R9 of the rear or meniscus lens of rearward convexity produce positive distortion. In the zoom lens of the invention, however, because the forward convex meniscus lens is made a refractive index distribution type lens, its front surface R7 and its internal transit power produce negative distortion which cancels that positive distortion. Further, the tendency of astigmatism toward under-correction in the telephoto end is moderated by the refraction at the front surface R7 of the refractive index distribution type lens.

NUMERICAL EXAMPLE 8 (FIGS. 15 and 16A-16C)

F = 100-150  FNO = 1:4.5-5.6  $2\omega = 56.8°-39.6°$

| | | | |
|---|---|---|---|
| R 1 = 65.249 | D 1 = 8.82 | N1 = 1.77250 | $\nu$1 = 49.6 |
| R 2 = -2483.232 | D 2 = 1.78 | | |
| R 3 = -83.949 | D 3 = 7.10 | N2 = 1.71736 | $\nu$2 = 29.5 |
| R 4 = 165.206 | D 4 = 14.13 | | |
| R 5 = 146.828 | D 5 = 8.92 | N3 = 1.69680 | $\nu$3 = 56.5 |
| R 6 = -73.346 | D 6 = Variable | | |
| R 7 = 174.348 | D 7 = 3.43 | N4 = N(h) | |
| R 8 = 115.650 | D 8 = 19.11 | | |
| R 9 = -34.255 | D 9 = 3.40 | N5 = 1.70154 | $\nu$5 = 41.2 |
| R10 = -64.196 | D10 = Variable | | |
| R11 = -98.407 | D11 = 5.43 | N6 = 1.71736 | $\nu$6 = 29.5 |
| R12 = -223.088 | | | |

| F | 100 | 125 | 150 |
|---|---|---|---|
| D 6 | 34.5 | 20.5 | 11.1 |
| D10 | 7.5 | 34.6 | 61.6 |

| $\lambda$ | $N_0$ | $N_1$ | $N_2$ | $N_3$ | $N_4$ |
|---|---|---|---|---|---|
| N(h) d | 1.60311 | $5.77742 \times 10^{-5}$ | $-3.78685 \times 10^{-8}$ | $-1.58918 \times 10^{-11}$ | $1.47096 \times 10^{-14}$ |
| g | 1.61539 | $5.35574 \times 10^{-5}$ | $-8.94738 \times 10^{-8}$ | $1.24709 \times 10^{-10}$ | $-1.17453 \times 10^{-13}$ |

Figure 17:
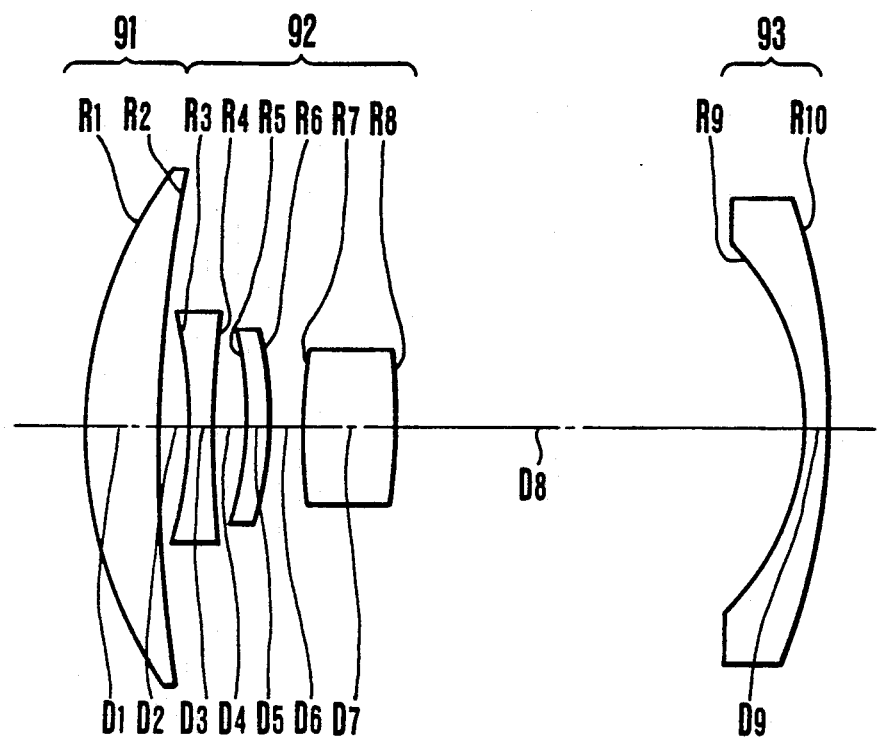

A ninth embodiment of the compact zoom lens shown in FIG. 17 comprises, from front to rear, a first lens unit 1 of positive power, a second lens unit 92 of positive power and a third lens unit 93 of negative power, the first and third lens units 91 and 93 being moved to effect zooming. The third lens unit 93 is constructed with one lens element or meniscus lens which is made of a radial distribution of refractive indices having the positive transit of power. Here, when in the wide angle end, the rear surface R2 of the first lens unit 91 is liable to produce positive distortion. In this embodiment, however, this aberration is corrected by the refraction by the front surface R9 of the refractive index distribution type lens of the third unit 93. Further, the under-corrected spherical aberration produced from the second lens unit 92 when in the telephoto end is corrected by the refractive index distribution type lens.

unit 103 has a negative refractive power, it may take positive refractive power, depending on the scheme of power distribution for the second lens unit 102. However, in any case, it has only a very weak refractive power as compared with the refractive power of the entire system.

Also, though, in this embodiment, the third lens unit 103 is made stationary, it may otherwise made movable axially in differential relation to the second lens unit 102 to effect zooming.

NUMERICAL EXAMPLE 9 (FIGS. 17 and 18A–18C)

| R 1 = 66.567 | D1 = 12.52 | N1 = 1.75500 | $\nu 1$ = 52.3 |
|---|---|---|---|
| R 2 = 274.136 | D2 = Variable | | |
| R 3 = −60.953 | D3 = 4.15 | N2 = 1.75520 | $\nu 2$ = 27.5 |
| R 4 = 189.516 | D4 = 4.92 | | |
| R 5 = −59.540 | D5 = 4.51 | N3 = 1.77250 | $\nu 3$ = 49.6 |
| R 6 = −44.645 | D6 = 5.14 | | |
| R 7 = 91.298 | D7 = 14.75 | N4 = 1.69350 | $\nu 4$ = 53.2 |
| R 8 = −118.908 | D8 = Variable | | |
| R 9 = −43.433 | D9 = 3.11 | N5 = N(h) | |
| R10 = −126.467 | | | |

| | F | 100 | 125 | 250 |
|---|---|---|---|---|
| | D2 | 4.5 | 16.5 | 28.9 |
| | D8 | 65.1 | 45.8 | 30.0 |

| $\lambda$ | $N_0$ | $N_1$ | $N_2$ | $N_3$ | $N_4$ |
|---|---|---|---|---|---|
| N(h) d | 1.77250 | $-1.20697 \times 10^{-4}$ | $1.38548 \times 10^{-7}$ | $-4.67436 \times 10^{-11}$ | $-7.15420 \times 10^{-16}$ |
| g | 1.79193 | $-1.20697 \times 10^{-4}$ | $1.38548 \times 10^{-7}$ | $-4.67436 \times 10^{-11}$ | $-7.15422 \times 10^{-16}$ |

The last or tenth embodiment is an expanded form of the 2-unit zoom lens where the second lens unit 102 is juxtapositioned by a third lens unit 103 which is stationary during zooming, and the third lens unit is made constructed by using a refractive index distribution type lens.

Figure 19:
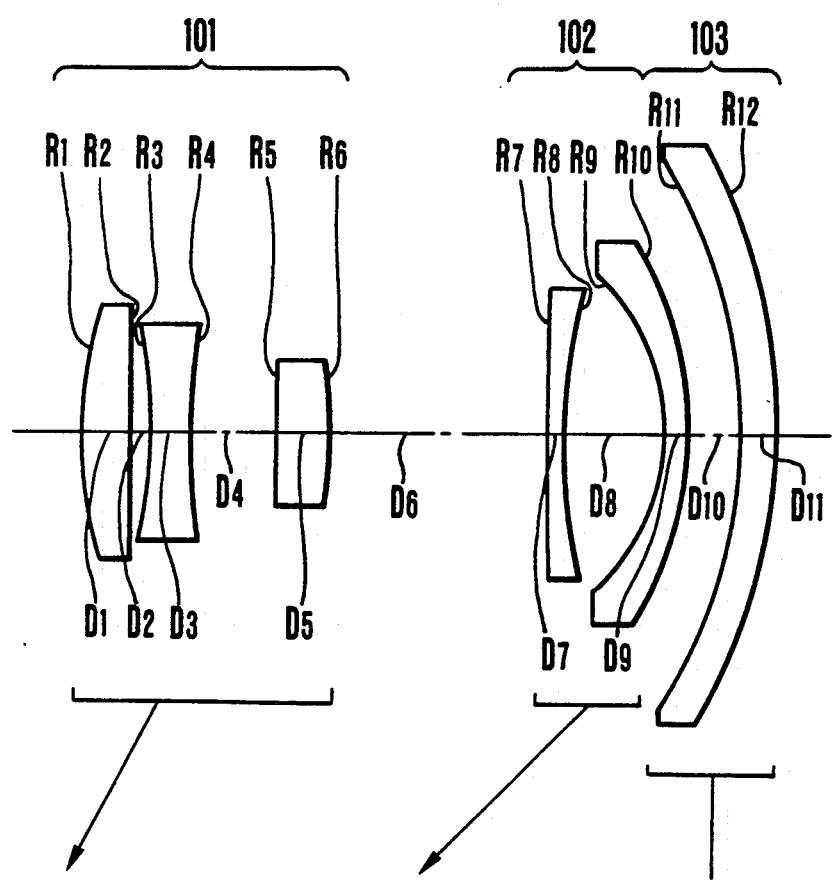
Figure 18A:
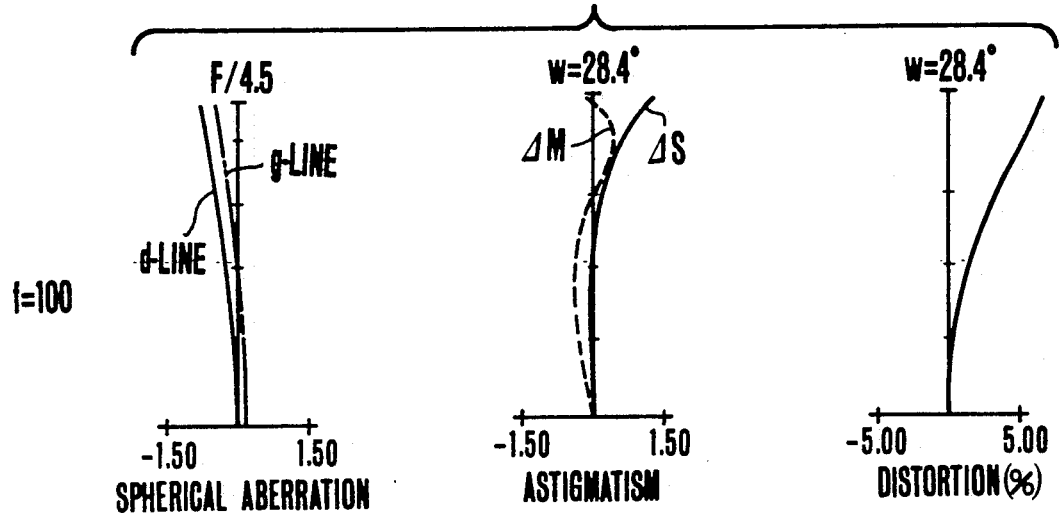
Figure 18B:
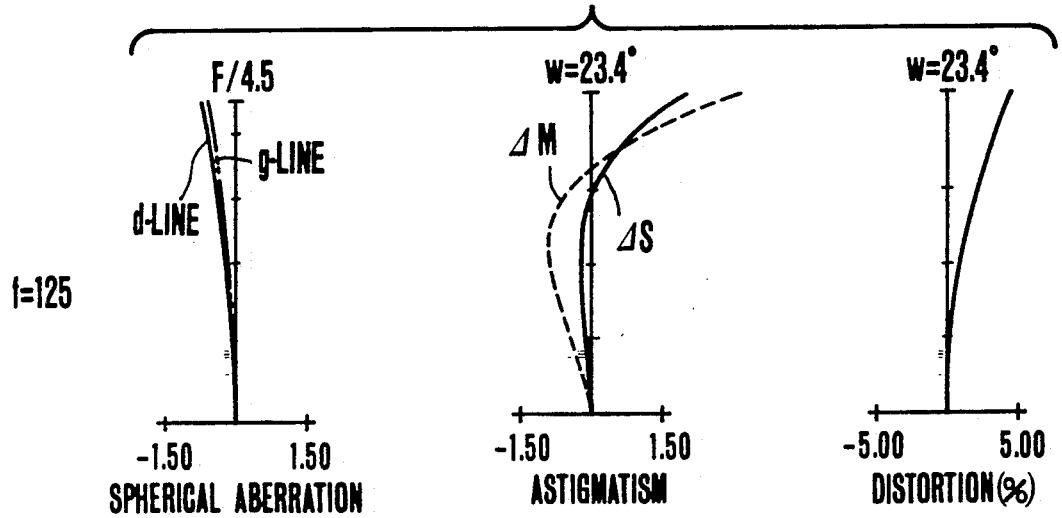
Figure 18C:
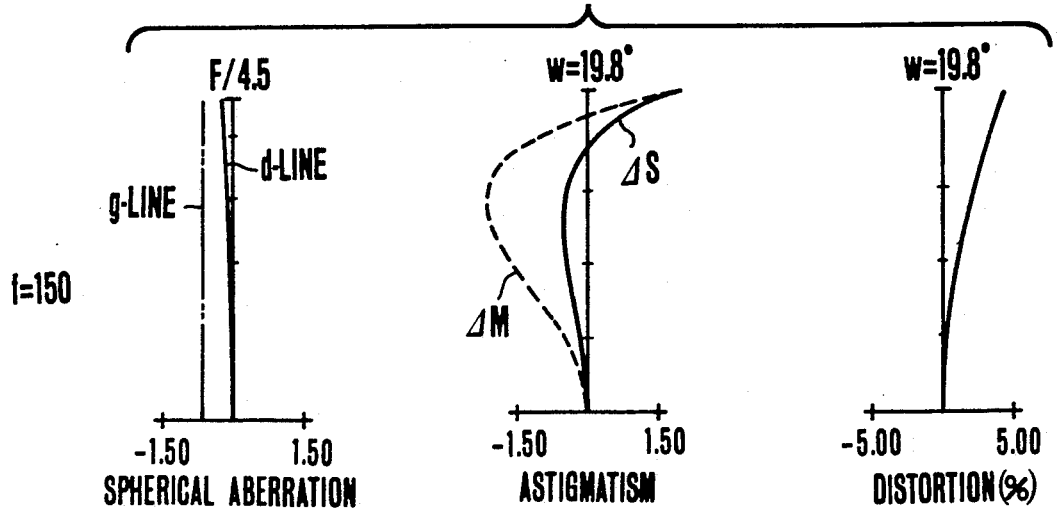
Figure 20A:
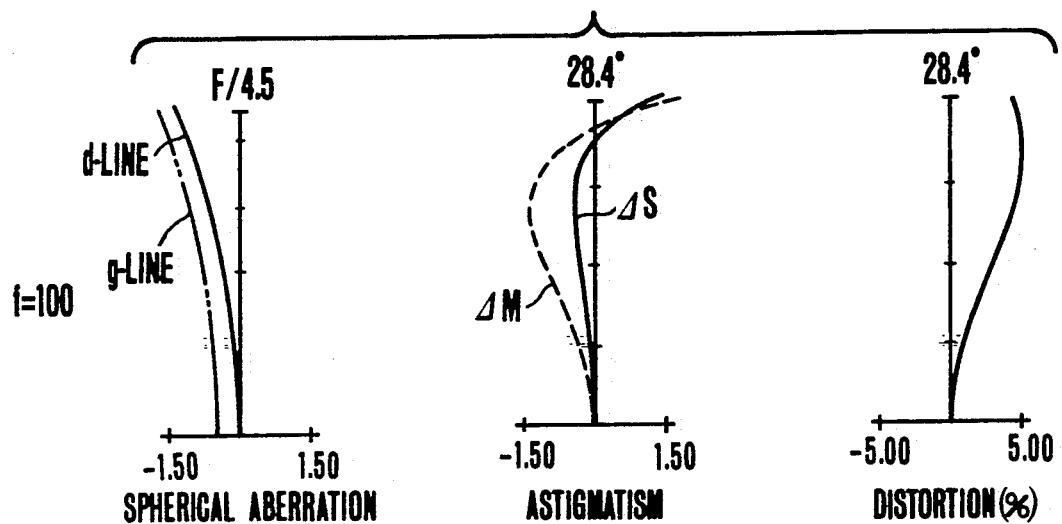
Figure 20B:
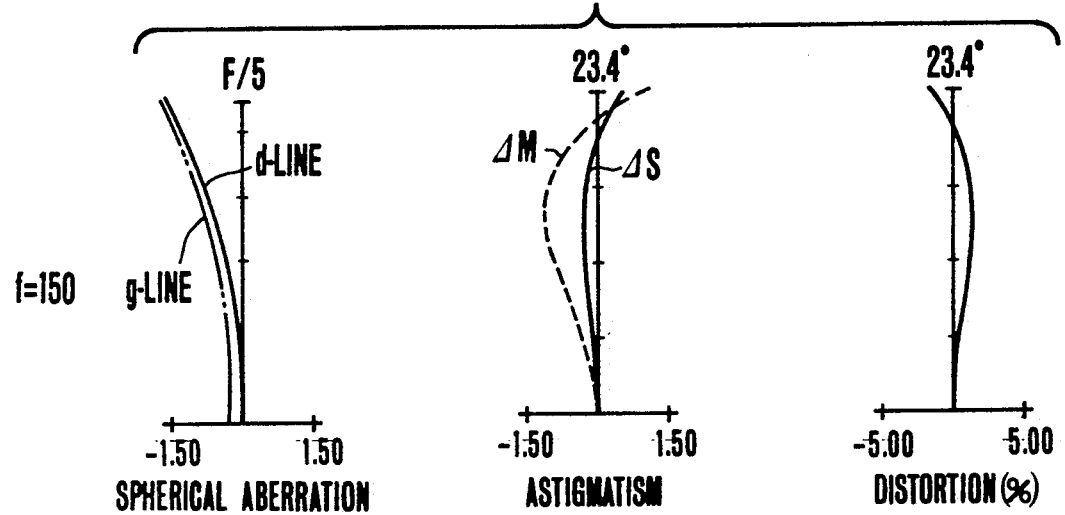
Figure 20C:
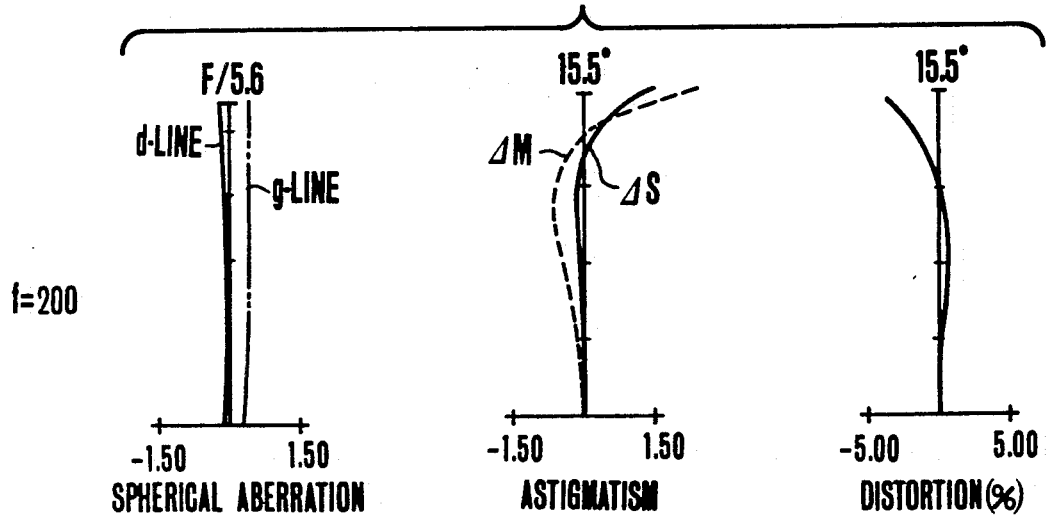

This embodiment (FIG. 19) is provided with a lens having a radial distribution of refractive indices in the third lens unit 103. Because the third lens unit 103 is held stationary during zooming, the introduction of the refractive index distribution type lens makes it possible to correct variations of inclination of image due to zooming. Though, in this embodiment, the third lens

NUMERICAL EXAMPLE 10 (FIGS. 19 and 20A–20C)

| F = 100–200 FNO = 1:4.5–5.6 2ω = 56.8°–30.3° | | | |
|---|---|---|---|
| R 1 = 62.654 | D 1 = 8.81 | N1 = 1.77250 | $\nu 1$ = 49.6 |
| R 2 = −6158.092 | D 2 = 2.71 | | |
| R 3 = −88.526 | D 3 = 7.02 | N2 = 1.71736 | $\nu 2$ = 29.5 |
| R 4 = 157.366 | D 4 = 14.05 | | |
| R 5 = 149.616 | D 5 = 8.90 | N3 = 1.69680 | $\nu 3$ = 56.5 |
| R 6 = −75.467 | D 6 = Variable | | |
| R 7 = 221.733 | D 7 = 3.43 | N4 = 1.60311 | $\nu 4$ = 60.7 |
| R 8 = 101.382 | D 8 = 17.77 | | |
| R 9 = −33.216 | D 9 = 3.40 | N5 = 1.70154 | $\nu 5$ = 41.2 |
| R10 = −55.552 | D10 = Variable | | |
| R11 = −85.966 | D11 = 5.42 | N6 = N(h) | |
| R12 = −98.375 | | | |

| | F | 100 | 150 | 200 |
|---|---|---|---|---|
| | D 6 | 35.37 | 21.35 | 12.0 |
| | D10 | 7.58 | 34.7 | 61.72 |

$$N(h) = N_0 + N_1 h^2 + N_2 h^4 + N_3 h^6 + N_4 h^8$$

| $\lambda$ | $N_0$ | $N_1$ | $N_2$ | $N_3$ | $N_4$ |
|---|---|---|---|---|---|
| N(h) d | 1.71736 | $2.88199 \times 10^{-4}$ | $-1.62079 \times 10^{-7}$ | $-1.13549 \times 10^{-11}$ | $3.86179 \times 10^{-15}$ |
| g | 1.74915 | $2.88199 \times 10^{-4}$ | $-1.62079 \times 10^{-7}$ | $-1.13549 \times 10^{-11}$ | $3.86179 \times 10^{-15}$ |

As has been described above, according to the present invention, because the number of lens elements in each lens unit of the zoom lens can be reduced, reduction of the weight and minimization of the size of the device can be achieved. Also because the thickness of each lens unit can be shortened by reducing the number of lens elements in each lens unit, there is produced a surplus space in each separation between the successive two units. This allows for an increase of the total zooming movement. Therefore, it is easy to achieve a great increase in the zooming range. Further, because the number of lens elements in each lens unit can be reduced, when the separations between the successive two of the lens units are shortened, the total length of the entire system can be very shortened.

On the other hand, because each lens unit can be well corrected for aberrations in itself, a good stability of aberration correction can be achieved. Also because the Petzval sum is reduced, the power of each lens unit may be strengthened in order to shorten the total length of the entire system. Because the produced Petzval sum is small, there is no need to use a strong surface curvature for correcting the Petzval sum, or a steep power arrangement for that purpose. This gives an advantage of minimizing higher order aberrations produced.

What is claimed is:

1. A zoom lens comprising:
   a positive lens unit having a plurality of lens components having a positive refractive power; and
   a negative lens unit having a plurality of lens components positioned nearer the image side than said positive lens unit;
   wherein said positive and negative lens units are movable such that a zooming operation from wide angle to telephoto is performed by decreasing the distance between said positive lens unit and said negative lens unit and by simultaneously moving said positive and negative lens units toward the object side, and wherein at least one lens unit compensates for image aberrations in cooperation with other lens components and includes at least one single distributive index type lens component having an optical axis in common with the other lens components, thereby to compensate for said image aberrations due to zooming throughout the entire zooming range.

2. A zoom lens according to claim 1, wherein said lens unit of negative refractive power includes a lens having refractive powers distributed therein.

3. A zoom lens according to claim 1, wherein said lens unit of positive refractive power includes a lens having refractive powers distributed therein.

4. A zoom lens according to claim 1, wherein the refractive index of said distributive index lens varies along the radius thereof.

5. A zoom lens according to claim 1, wherein the refractive index of said distributive index lens varies along the optical axis.

6. A zoom lens according to claim 1, further comprising, on the image side of said negative lens unit, a fixed lens unit having a power such that the combination of said negative lens unit and said fixed lens unit has a negative power.

7. A zoom lens according to claim 1, further comprising, between said positive lens unit and said negative lens unit, a fixed lens unit having a power such that the combination of said positive lens unit and said fixed lens unit has a positive power.

8. A zoom lens according to claim 1, wherein said negative lens unit comprises a negative meniscus lens with a concave surface facing the object side.

9. A zoom lens comprising:
   a positive lens unit having a plurality of lens components having a positive refractive power; and
   a negative lens unit having a plurality of lens components positioned nearer the image side than said positive lens unit; and,
   a fixed lens unit, on the image side of said negative lens unit, and having a power such that the combination of said negative lens unit and said fixed lens unit has a negative power;
   wherein said positive and negative lens units are movable such that a zooming operation from wide angle to telephoto is performed by decreasing the distance between said positive lens unit and said negative lens unit and by simultaneously moving said positive and negative lens units toward the object side, and wherein at least one lens unit compensates for image aberrations in cooperation with other lens components and includes at least one single, distributive index type lens component having an optical axis in common with the other lens components, thereby to achieve an improved degree of compactness, while reducing said image aberrations throughout the entire zooming range.

10. A zoom lens comprising:
    a positive lens unit having a plurality of lens components having a positive refractive power; and
    a negative lens unit having a plurality of lens components positioned nearer the image side than said positive lens unit; and,
    a fixed lens unit, between said positive lens unit and said negative lens unit, and having a power such that the combination of said positive lens unit and said fixed lens unit has a positive power;
    wherein said positive and negative lens units are movable such that a zooming operation from wide angle to telephoto is performed by decreasing the distance between said positive lens unit and said negative lens unit and by simultaneously moving said positive and negative lens units toward the object side, and wherein at least one lens unit compensates for image aberrations in cooperation with other lens components and includes at least one single, distributive index type lens component having an optical axis in common with the other lens components, thereby to achieve an improved degree of compactness, while reducing said image aberrations throughout the entire zooming range.

* * * * *

UNITED STATES PATENT AND TRADEMARK OFFICE
CERTIFICATE OF CORRECTION

PATENT NO. : 5,011,272
DATED : April 30, 1991
INVENTOR(S) : Hiroki Nakayama

It is certified that error appears in the above-identified patent and that said Letters Patent is hereby corrected as shown below:

COLUMN 1

Line 5, "Dec. 18, 1985." should read --Dec. 18, 1985, now abandoned.--
Line 10, "general" should read --the general--.
Line 21, "incovenient" should read --inconvenient--.
Line 28, "by" should read --of-- and "of" should read --by--.

COLUMN 2

Line 67, "crease" should read --creases--.

COLUMN 3

Line 5, "increase" should read --increases--.
Line 51, "descreasing" should read --decreasing--.
Line 60, "increase" should read --increases--.
Line 62, "descreases" should read --decreases--.

UNITED STATES PATENT AND TRADEMARK OFFICE
CERTIFICATE OF CORRECTION

PATENT NO. : 5,011,272              Page 2 of 3
DATED      : April 30, 1991
INVENTOR(S): Hiroki Nakayama, et al.

It is certified that error appears in the above-identified patent and that said Letters Patent is hereby corrected as shown below:

COLUMN 5

Line 10, "$\Delta M - \Delta S$" should read -- $\Delta M - \Delta S,$ --.

COLUMN 6

Line 16, "descreases" should read --decreases--.
Line 26, "Petval" should read --Petzval--.

COLUMN 7

Numerical Example 3, next to last line, under the heading "$N_2$", "$9.2487 \times 10^{-7}$" should read --$9.24847 \times 10^{-7}$--.

COLUMN 9

Line 21, "of", second occurrence, should be deleted.
Line 42, "moves" should read --move--.

UNITED STATES PATENT AND TRADEMARK OFFICE
CERTIFICATE OF CORRECTION

PATENT NO. : 5,011,272
DATED : April 30, 1991
INVENTOR(S) : Hiroki Nakayama, et al.

It is certified that error appears in the above-identified patent and that said Letters Patent is hereby corrected as shown below:

COLUMN 14

Line 8, "made" should read --be made--.

IN THE CLAIMS

COLUMN 15

Line 40, "single" should read --single,--.

Signed and Sealed this

Third Day of May, 1994

Attest:

BRUCE LEHMAN

Attesting Officer

Commissioner of Patents and Trademarks